(12) United States Patent
Hung

(10) Patent No.: US 9,993,071 B2
(45) Date of Patent: Jun. 12, 2018

(54) SUPPORT DEVICE WITH TWO CONSTANT FORCE SPRINGS

(71) Applicant: MODERNSOLID INDUSTRIAL CO, LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days. days.

(21) Appl. No.: 15/634,088

(22) Filed: Jun. 27, 2017

(65) Prior Publication Data

US 2018/0020825 A1 Jan. 25, 2018

(30) Foreign Application Priority Data

Jul. 20, 2016 (TW) .............................. 105210911 U

(51) Int. Cl.
| | |
|---|---|
| *A47B 41/04* | (2006.01) |
| *A47B 21/04* | (2006.01) |
| *A47B 97/00* | (2006.01) |
| *F16M 13/02* | (2006.01) |
| *A47B 21/06* | (2006.01) |
| *A47B 21/03* | (2006.01) |
| *A47B 21/02* | (2006.01) |

(52) U.S. Cl.
CPC .............. *A47B 21/04* (2013.01); *A47B 21/02* (2013.01); *A47B 21/0314* (2013.01); *A47B 21/06* (2013.01); *A47B 97/00* (2013.01); *F16M 13/022* (2013.01); *A47B 2021/0364* (2013.01); *A47B 2097/006* (2013.01); *F16M 2200/06* (2013.01)

(58) Field of Classification Search
CPC ..... A47B 21/04; A47B 21/02; A47B 21/0314; A47B 21/06; A47B 2021/0364; A47B 2097/006; F16M 13/022; F16M 2200/06
See application file for complete search history.

(56) References Cited

U.S. PATENT DOCUMENTS

| | | | | |
|---|---|---|---|---|
| 6,113,046 | A * | 9/2000 | Wang | A47B 21/0314 248/278.1 |
| 6,286,794 | B1 * | 9/2001 | Harbin | A47B 21/02 248/123.2 |
| 2010/0148647 | A1 * | 6/2010 | Burgess | A47B 21/00 312/327 |
| 2012/0119040 | A1 * | 5/2012 | Ergun | A47B 21/02 248/126 |
| 2012/0187056 | A1 * | 7/2012 | Hazzard | A47B 21/02 211/26 |
| 2013/0126682 | A1 * | 5/2013 | Tholkes | F16M 11/046 248/125.8 |

(Continued)

*Primary Examiner* — Hanh V Tran
(74) *Attorney, Agent, or Firm* — Burris Law, PLLC

(57) ABSTRACT

A support device includes an upright frame and upper and lower constant force springs. The upright frame includes upper and lower members respectively defining upper and lower receiving spaces, and an upright frame body between the upper and lower members and having two first slide grooves communicating with the upper receiving space and two second slide grooves communicating with the lower receiving space. Each of the upper and lower constant force springs includes a coiled portion disposed in a respective one of the upper and lower receiving spaces, and a free end connected to the coiled portion. First and second slide units are slidably mounted on the upright frame body.

18 Claims, 36 Drawing Sheets

(56) References Cited

U.S. PATENT DOCUMENTS

| | | | | |
|---|---|---|---|---|
| 2013/0146728 A1* | 6/2013 | Ergun | ............ | F16M 11/10 |
| | | | | 248/291.1 |
| 2014/0034799 A1* | 2/2014 | Fallows | ............ | F16M 11/046 |
| | | | | 248/297.21 |
| 2015/0108294 A1* | 4/2015 | Elliott | ............ | F16M 13/022 |
| | | | | 248/125.1 |
| 2015/0354746 A1* | 12/2015 | Hung | ............ | F16M 11/18 |
| | | | | 211/26 |
| 2017/0013957 A1* | 1/2017 | McRorie, III | ...... | A47B 21/02 |
| 2017/0219158 A1* | 8/2017 | Chin | ............ | F16M 11/046 |

* cited by examiner

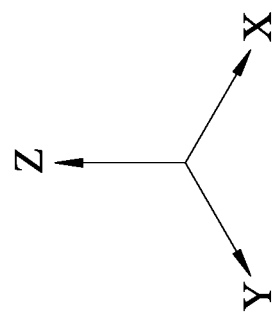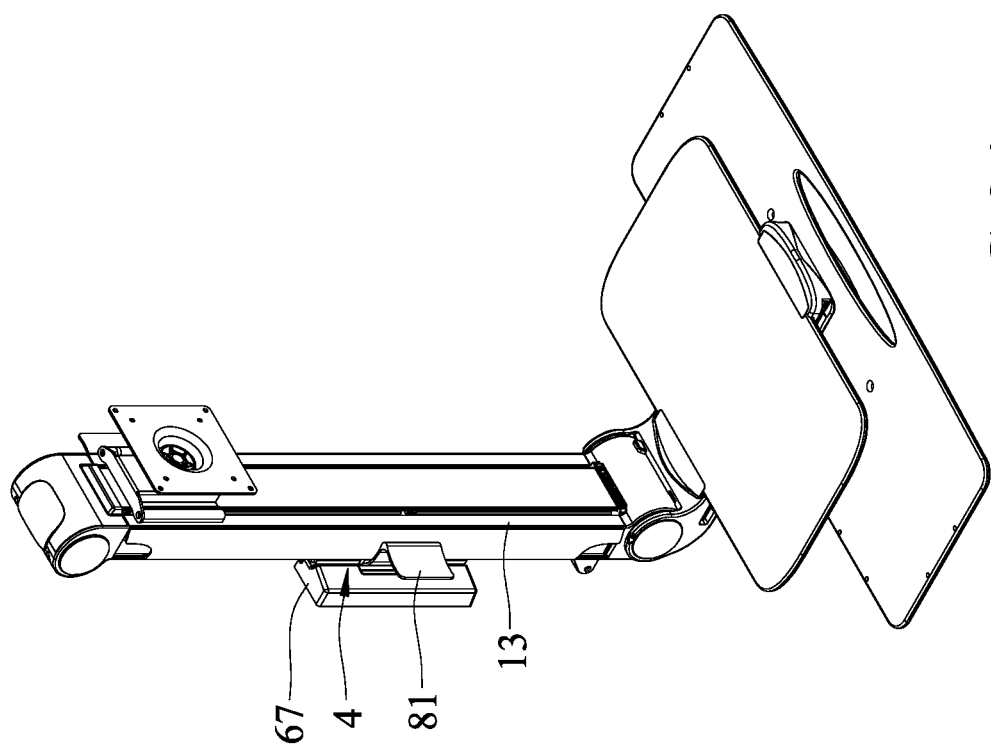
FIG.24

SUPPORT DEVICE WITH TWO CONSTANT FORCE SPRINGS

CROSS REFERENCE TO RELATED APPLICATION

This application claims priority of Taiwanese Patent Application Number 105210911, filed on Jul. 20, 2016.

FIELD

The disclosure relates to a monitor support device, more particularly to a support device that can effectively save cost and that has two constant force springs.

BACKGROUND

An existing monitor support device, which can be clamped on a tabletop, includes an upright frame, a slide unit disposed on a rear surface of the upright frame and slidable upward and downward along the rear surface of the upright frame, a monitor mount disposed on a front surface of the upright frame and slidable upward and downward along the front surface of the upright frame, a work platform disposed below the monitor mount, and a clamping seat disposed on the slide unit opposite to the upright frame and configured to clamp on the tabletop. The slide unit includes an air pressure bar, and a slide member that is slidable upward and downward along the upright frame through the air pressure bar. Through relative sliding movement of the upright frame and the slide unit, the height of the monitor mount and the work platform relative to the tabletop can be adjusted according to the requirement. Although the use of the air pressure bar to control the height adjustment has a high accuracy, the price of the air pressure bar is expensive, so that the manufacturing cost of the existing monitor support device is high. Further, because the work platform is fixed to a bottom end of the upright frame and cannot be rotated or folded, the work platform occupies a substantial space when not in use.

SUMMARY

Therefore, an object of the present disclosure is to provide a support device that can effectively save cost and that has two constant force springs.

According to this disclosure, a support device for supporting a monitor comprises an upright frame, an upper constant force spring, a lower constant force spring, a first slide unit and a second slide unit.

The upright frame includes an upright frame body, an upper member connected to a top end of the upright frame body and defining an upper receiving space, and a lower member connected to a bottom end of the upright frame body and defining a lower receiving space. The upright frame body includes two opposite side walls, an intermediate wall interconnecting the side walls, two first slide grooves that are respectively formed in the side walls, that are located at one side of the intermediate wall and that communicate with the upper receiving space, and two second slide grooves that are respectively formed in the side walls, that are located at an opposite side of the intermediate wall and that communicate with the lower receiving space. Each of the first and second slide grooves extend along a length direction of a corresponding one of the side walls.

The upper constant force spring is configured as a rolled metal strip and includes a coiled portion disposed in the upper receiving space, and a free end connected to the coiled portion. The lower constant force spring is configured as a rolled metal strip and includes a coiled portion disposed in the lower receiving space, and a free end connected to the coiled portion of the lower constant force spring. The first slide unit is slidably mounted on the upright frame body, is configured to be connected with the monitor, and includes a first slide seat disposed on the one side of the intermediate wall and having two first protrusions received respectively in the first slide grooves, and an upper connecting piece disposed on a top portion of the first slide seat and connected to the free end of the upper constant force spring. The second slide unit is slidably mounted on the upright frame body, and includes a second slide seat disposed on the opposite side of the intermediate wall and having two second protrusions received respectively in the second slide grooves, and a lower connecting piece disposed on a bottom portion of the second slide seat and connected to the free end of the lower constant force spring.

BRIEF DESCRIPTION OF THE DRAWINGS

Other features and advantages of the present disclosure will become apparent in the following detailed description of the embodiments with reference to the accompanying drawings, of which:

FIG. 24 is another perspective view of the second embodiment taken from another angle;

DETAILED DESCRIPTION

Figure 1:
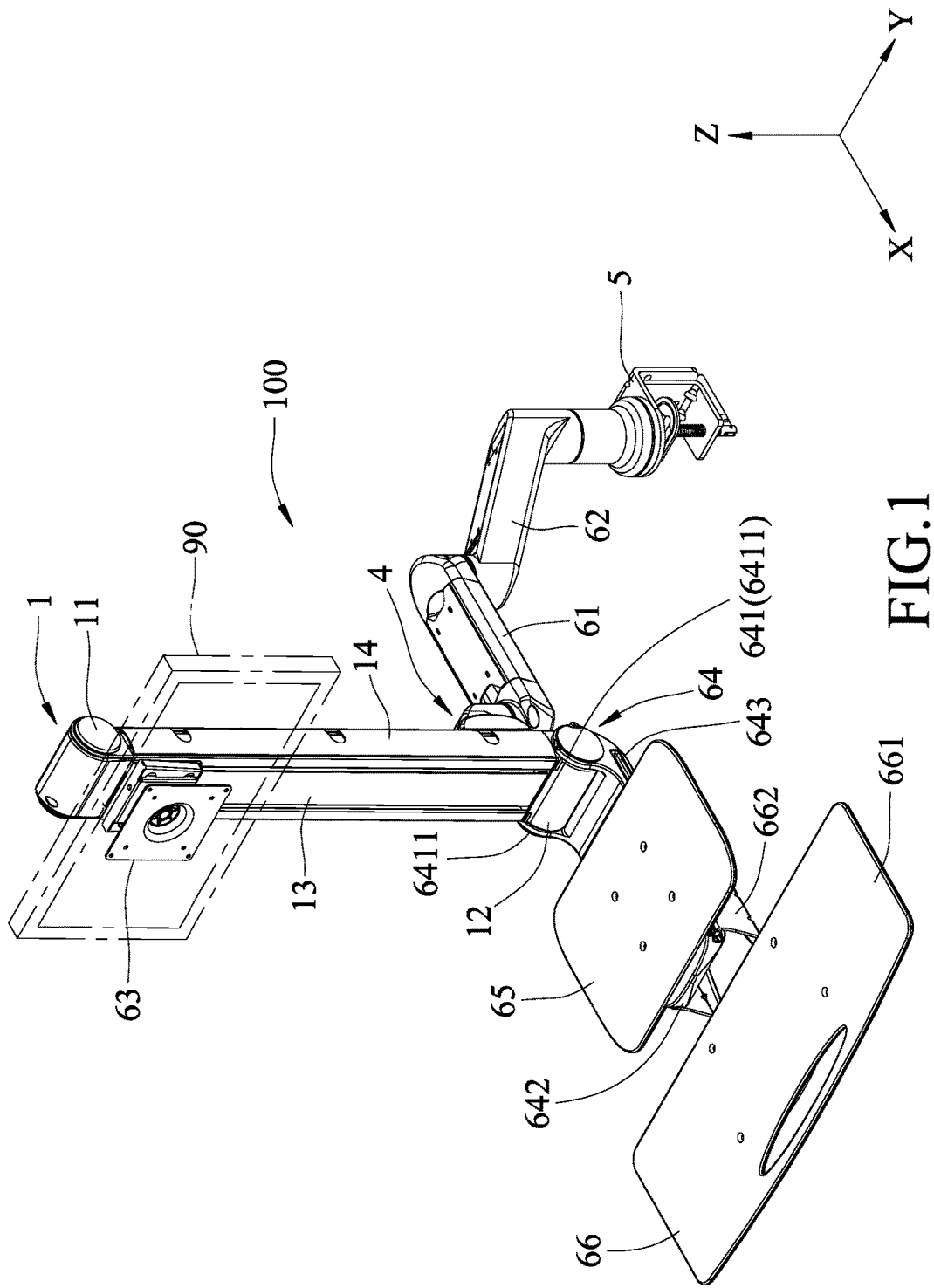
FIG. 1 is a perspective view of a support device according to the first embodiment of the present disclosure configured to support a monitor.

Before the present disclosure is described in greater detail with reference to the accompanying embodiments, it should be noted herein that like elements are denoted by the same reference numerals throughout the disclosure.

Referring to FIGS. 1 to 12, a support device 100 according to the first embodiment of the present disclosure is configured to support a monitor 90, and includes an upright frame 1, an upper constant force spring 21, a lower constant force spring 22, a first slide unit 3, a second slide unit 4, a clamping seat 5, a main suspension arm 61 and an auxiliary suspension arm 62.

The upright frame 1 includes an upright frame body 13, an upper member 11, a lower member 12, and two side covers 14. The upright frame body 13 extends along a first direction (Z), and includes two side walls 131 opposite to each other along a second direction (Y) transverse to the first direction (Z), an intermediate wall 132 interconnecting the side walls 131, two first slide grooves 133 respectively formed in the side walls 131 and located at one side of the intermediate wall 132, and two second slide grooves 134 respectively formed in the side walls 131 and located at an opposite side of the intermediate wall 132. Each first slide groove 133 is defined by a first groove-defining wall 136, and each second slide groove 134 is defined by a second groove-defining wall 138.

The upper member 11 is connected to a top end of the upright frame body 13, defines an upper receiving space 111, and has an upper spring support 112 (see FIG. 11) disposed in the upper receiving space 111. The first slide grooves 133 communicate with the upper receiving space 111. The lower member 12 is connected to a bottom end of the upright frame body 13, defines a lower receiving space 121, and has a lower spring support 122 (see FIG. 12) disposed in the lower receiving space 121. The second slide grooves 134 communicate with the lower receiving space 121.

Figure 3:
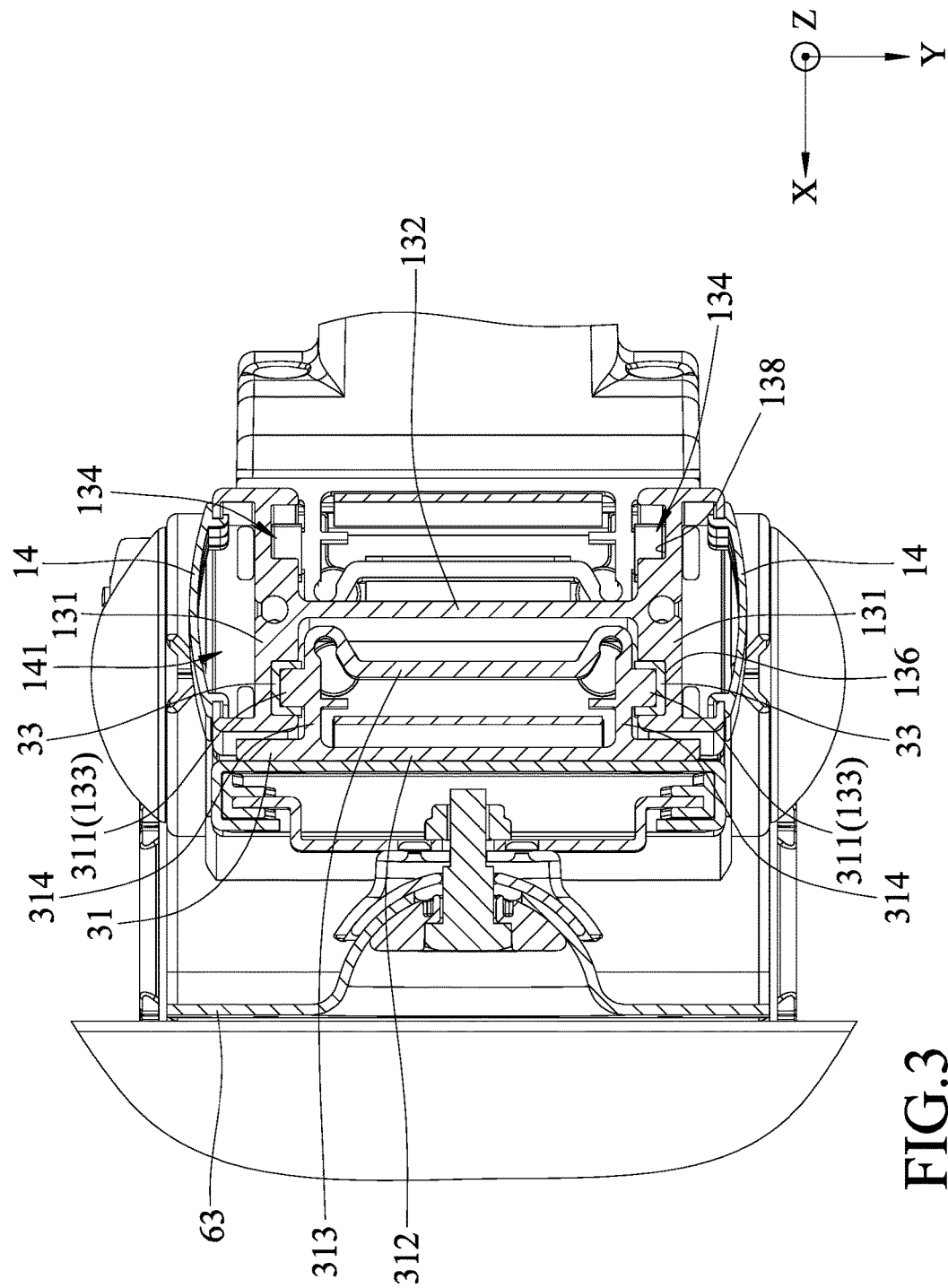
FIG. 3 is a sectional view of the first embodiment taken along line III-III of FIG. 2.
Figure 4:
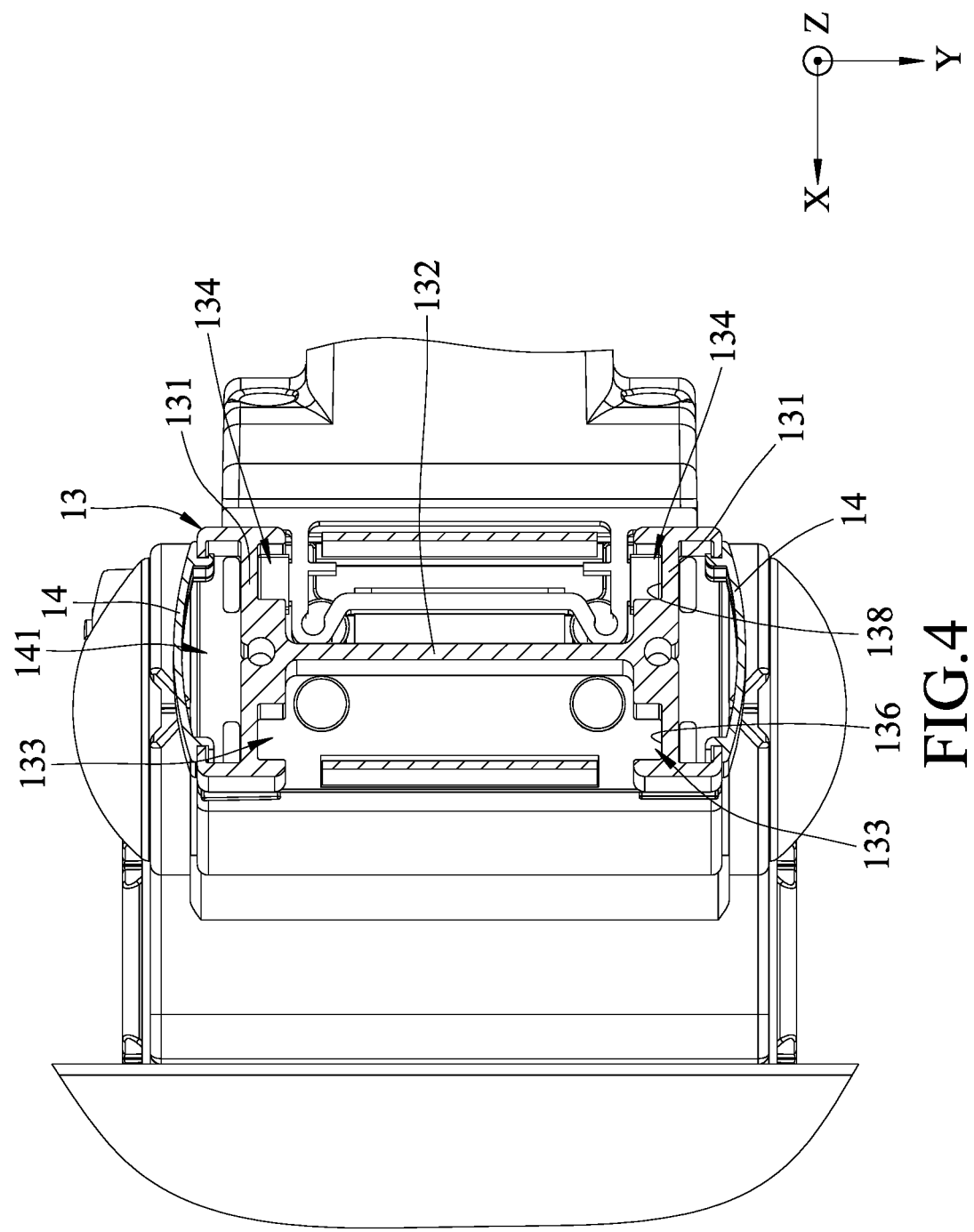
FIG. 4 is a sectional view of the first embodiment taken along line IV-IV of FIG. 2.
Figure 5:
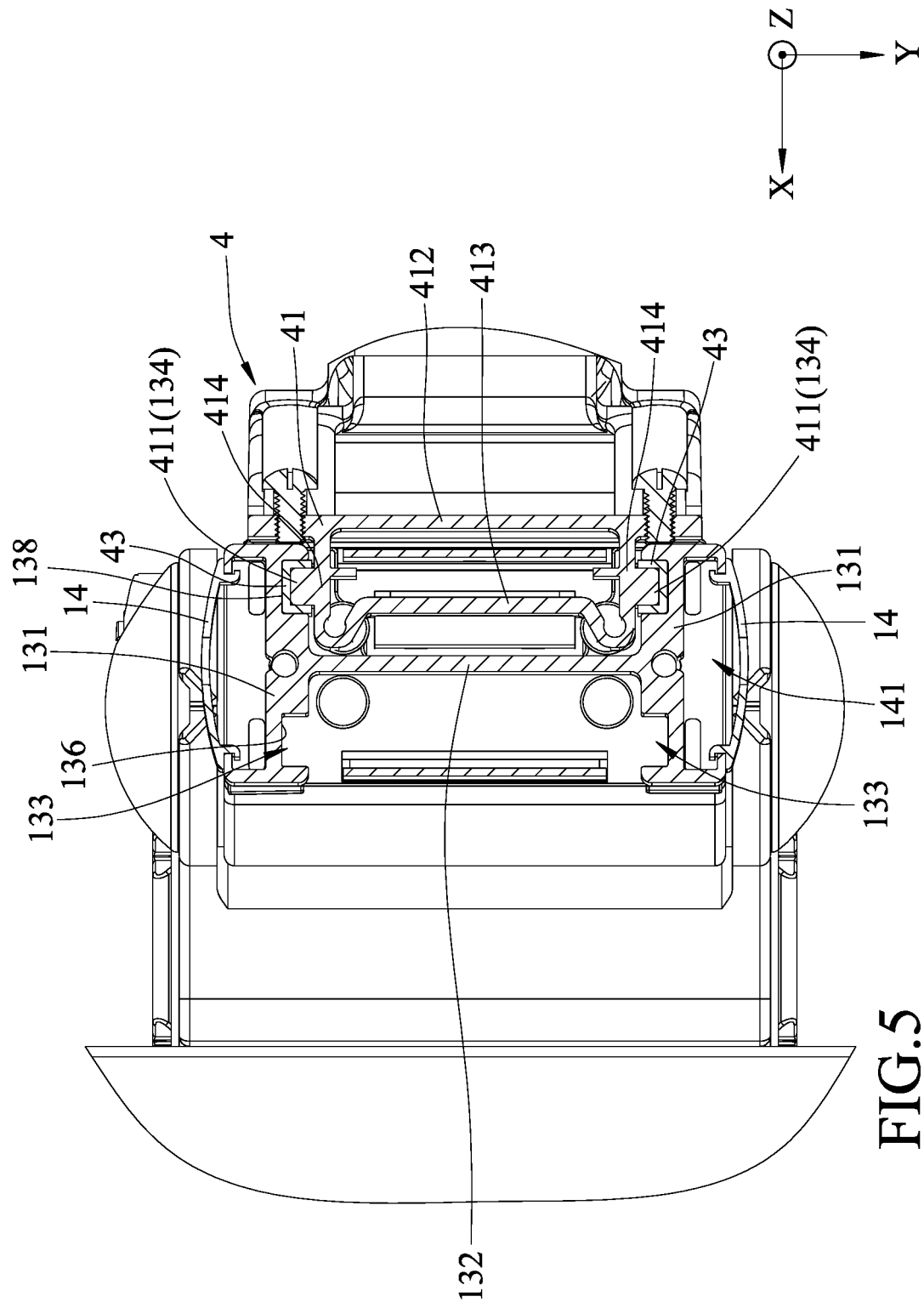
FIG. 5 is a sectional view of the first embodiment taken along line V-V of FIG. 2.

The side covers 14, as shown in FIGS. 3 to 5, are respectively disposed on outer sides of the side walls 131. Each side cover 14 cooperates with a respective one of the side walls 131 to define therebetween a wire-receiving groove 141 for receiving electrical wires.

Figure 10:
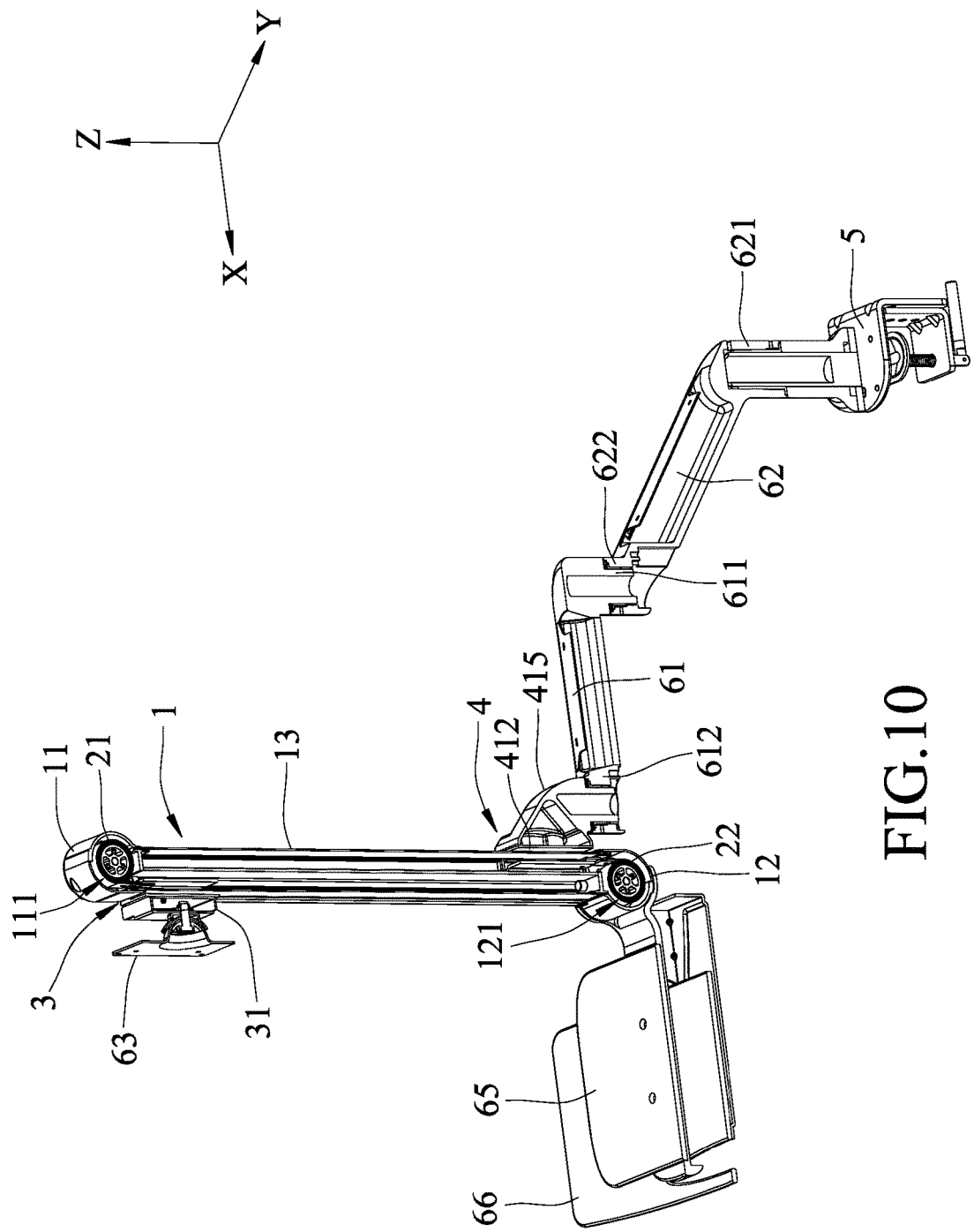
FIG. 10 is another perspective view of the first embodiment, illustrating an upper constant force spring being disposed in the upper member of the upright frame and a lower constant force spring being disposed in a lower member of the upright frame.
Figure 11:
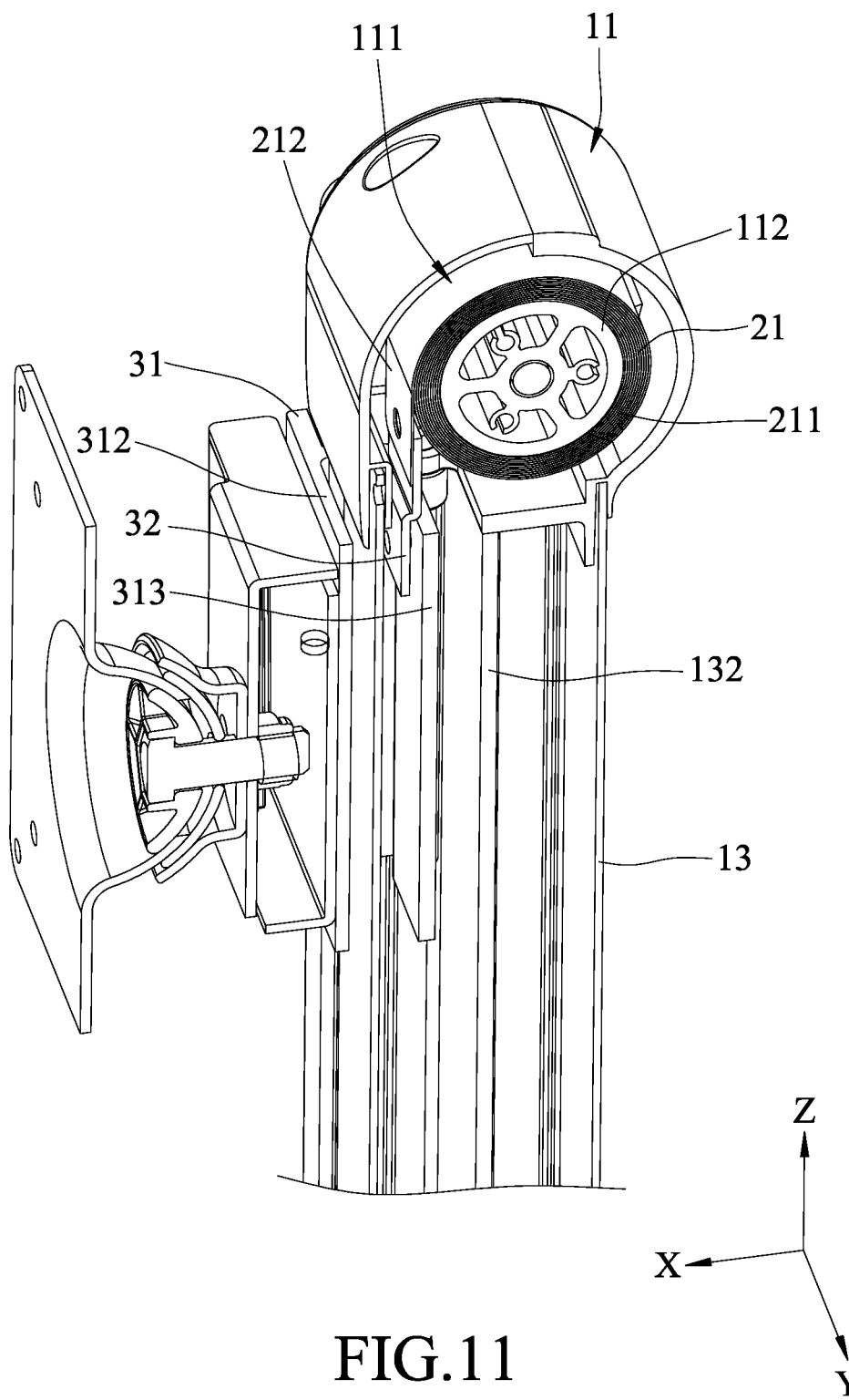
FIG. 11 is an enlarged fragmentary perspective view of an upper portion of FIG. 10.
Figure 12:
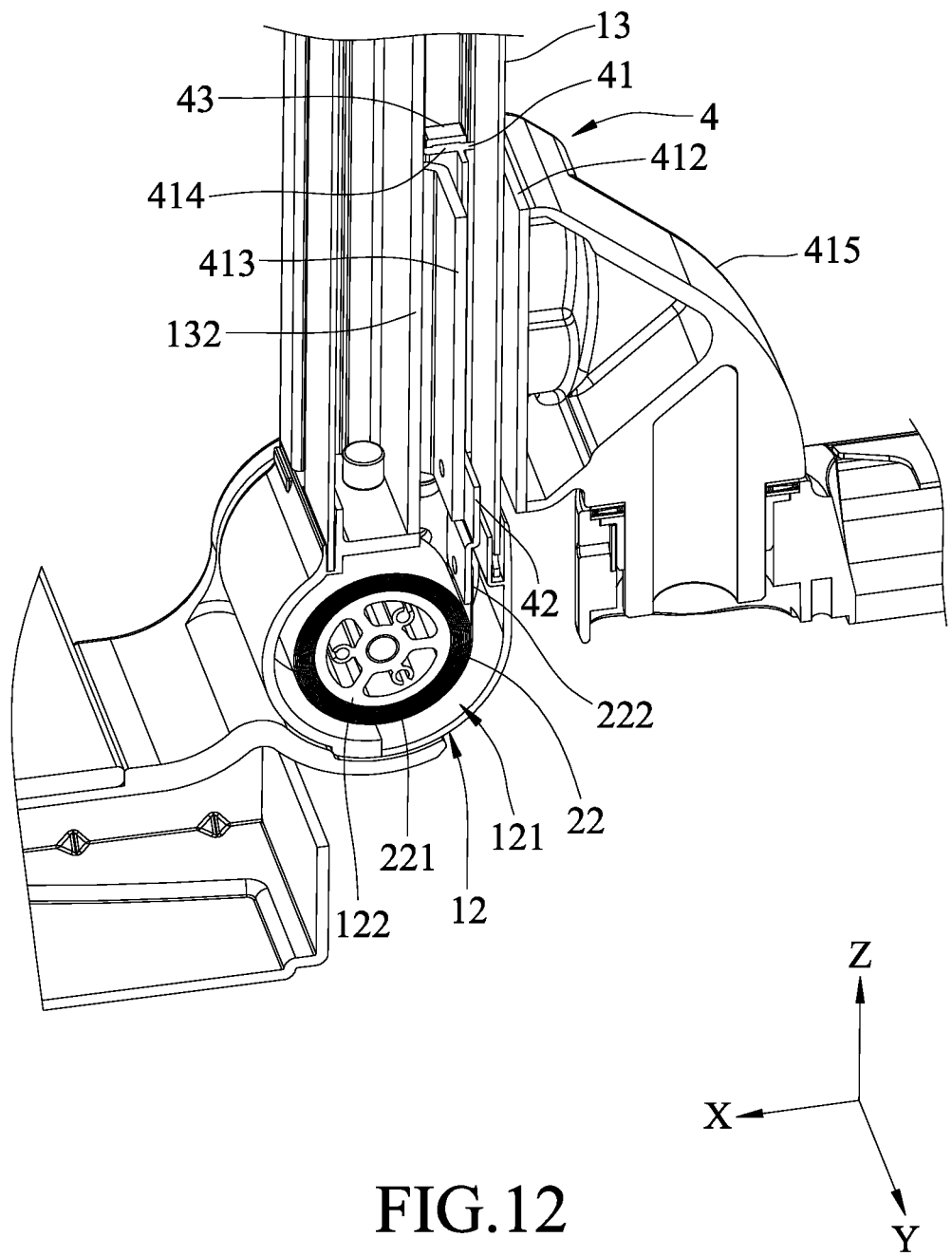
FIG. 12 is an enlarged fragmentary perspective view of a lower portion of FIG. 10.

As shown in FIGS. 10 to 12, the upper constant force spring 21 is configured as a rolled metal strip, and includes a coiled portion 211 disposed in the upper receiving space 111 and wound around the upper spring support 112, and a free end 212 connected to the coiled portion 211. The lower constant force spring 22 is also configured as a rolled metal strip, and includes a coiled port ion 221 disposed in the lower receiving space 121 and wound around the lower spring support 122, and a free end 222 connected to the coiled portion 221.

With reference to FIGS. 1, 3 and 11, the first slide unit 3 is slidably mounted on the upright frame body 13, is configured to be connected with the monitor 90, and includes a first slide seat 31 disposed on one side of the intermediate wall 132, and an upper connecting piece 32 disposed on a top portion of the first slide seat 31 and connected to the free end 212 of the upper constant force spring 21.

The first slide seat 31 includes a first side plate 312 spaced apart from the intermediate wall 132 along a third direction (X) transverse to the first and second directions (Z, Y), a second side plate 313 disposed between the first side plate 312 and the intermediate wall 132, two first connecting plates 314 connected between the first and second side plates 312, 313, and two first protrusions 311 respectively protruding from the first connecting plates 314 and received respectively and slidably in the first slide grooves 133.

Figure 15:
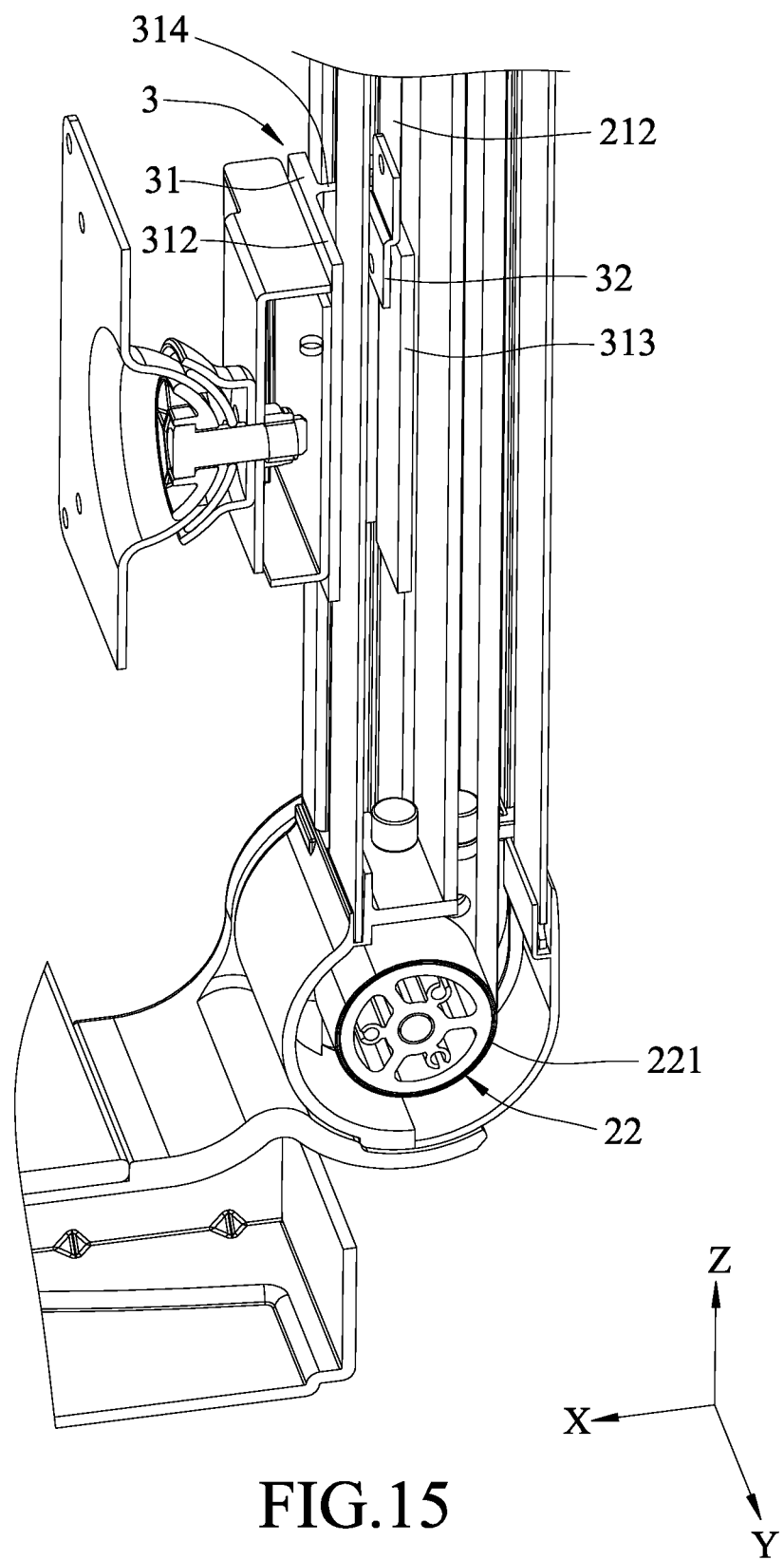
FIG. 15 is an enlarged fragmentary perspective view of a lower portion of FIG. 13.

The upper connecting piece 32 is fixed to a top portion of the second side plate 313, as shown in FIGS. 11 and 15. It should be noted herein that the upper connecting piece 32 may be formed integrally as one piece with the first slide seat 31. In this embodiment, the first slide unit 3 further includes a pair of first protective members 33 each of which is disposed between the first groove-defining wall 136 of one of the first slide grooves 133 and a corresponding one of the first protrusions 311 such that each first protective member 33 covers the corresponding first protrusion 311, as shown in FIG. 3.

Figure 13:
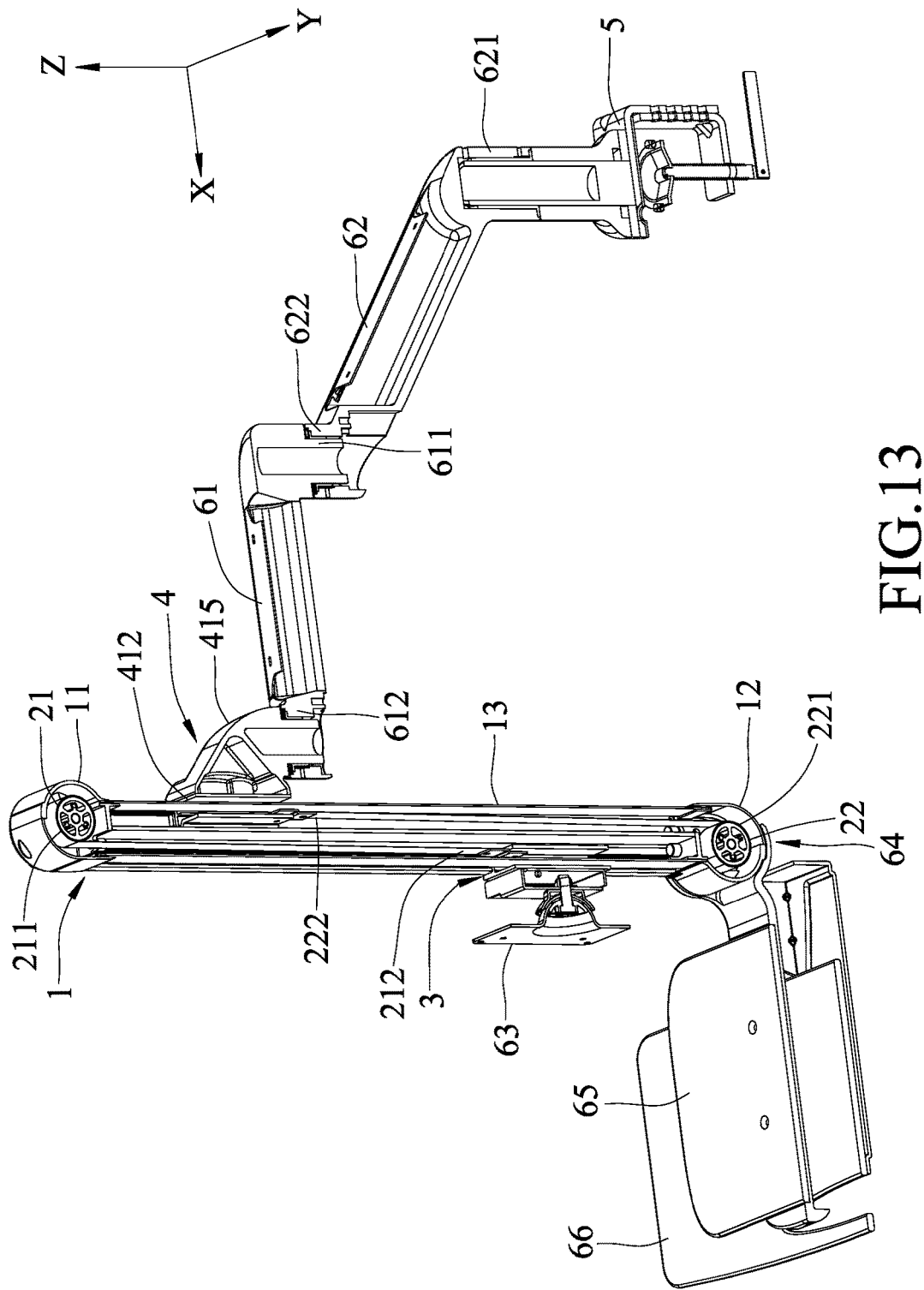
FIG. 13 is still another perspective view of the first embodiment, illustrating a free end of the upper constant force spring being pulled to move away from the upper member of the upright frame, and a free end of the lower constant force spring being pulled to move away from the lower member of the upright frame.

With reference to FIGS. 5, 12 and 13, the second slide unit 4 is slidably mounted on the upright frame body 13 opposite to the first slide unit 3 along the third direction (X), and includes a second slide seat 41 disposed on the opposite side of the intermediate wall 132, and a lower connecting piece 42 disposed on a bottom portion of the second slide seat 41 and connected to the free end 222 of the lower constant force spring 22.

The second slide seat 41 includes a first side plate 412 spaced apart from the intermediate wall 132 along the third direction (X), a second side plate 413 disposed between the first side plate 412 and the intermediate wall 132, two second connecting plates 414 connected between the first and second side plates 412, 413, a connecting body 415 (see FIGS. 10 and 12) connected to the first side plate 412, and two second protrusions 411 respectively protruding from the second connecting plates 414 and received slidably and respectively in the second slide grooves 134.

Figure 14:
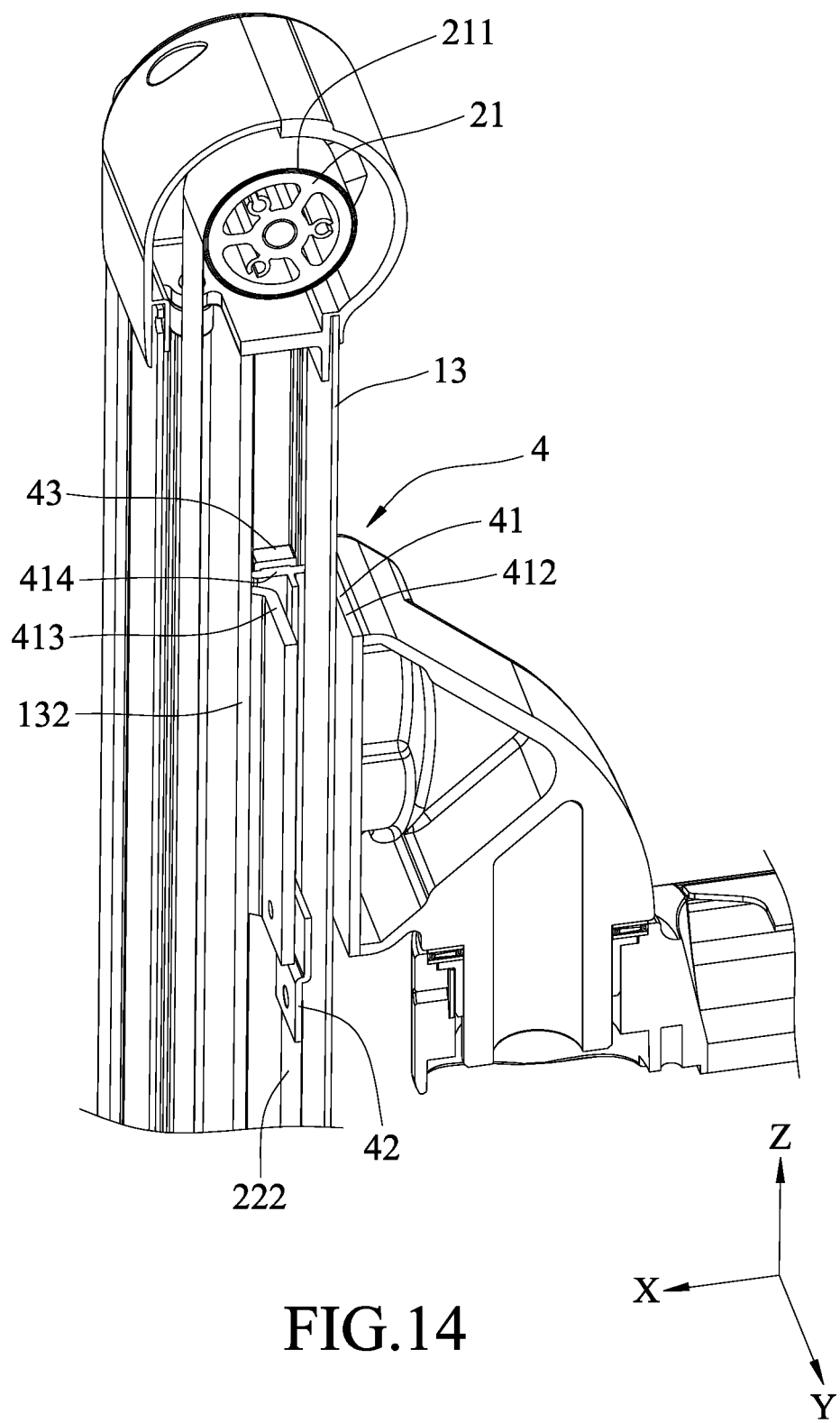
FIG. 14 is an enlarged fragmentary perspective view of an upper portion of FIG. 13.

The lower connecting piece 42 is fixed to a bottom portion of the second side plate 413, as shown in FIGS. 12 and 14. It should be noted herein that the lower connecting piece 42 may be formed integrally as one piece with the second slide seat 41. In this embodiment, the second slide unit 4 further includes two second protective members 43 each of which is disposed between the second groove-defining wall 138 of one of the second slide grooves 133 and a corresponding one of the second protrusions 411 such that each second protective member 43 covers the corresponding second protrusion 411, as shown in FIG. 5.

Figure 2:
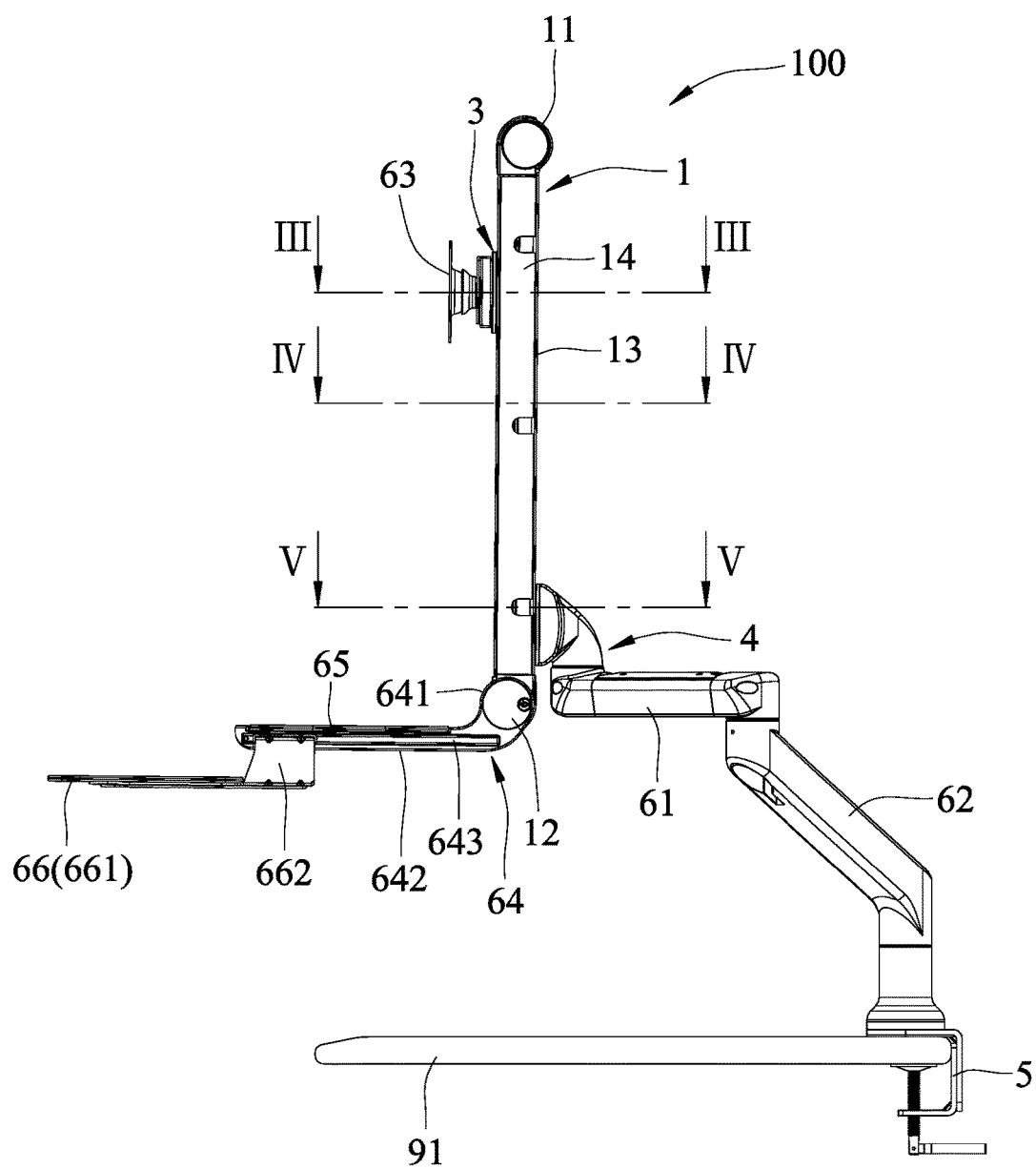
FIG. 2 is a schematic side view of the first embodiment in an expanded state and being clamped on a tabletop.

The clamping seat 5 is spaced apart from the upright frame 1, and is configured to be clamped on a support surface, such as a tabletop 91 (see FIG. 2).

With reference to FIGS. 10 and 13, in this embodiment, the main suspension arm 61 has a first end 611 spaced apart from the upright frame 1, and a second end 612 opposite to the first end 611 and pivoted to the connecting body 415 at a side opposite to the first slide plate 412. The auxiliary suspension arm 62 is disposed between the main suspension arm 61 and the clamping seat 5, and has a first end 621 pivoted to the clamping seat 5, and a second end 622 opposite to the first end 621 and pivoted to the first end 611 of the main suspension arm 61. Each of the main and auxiliary suspension arms 61, 62 has a degree of freedom in rotation on planes formed by the second and third directions (Y, X) such that the upright frame 1 is movable relative to the clamping seat 5 on the planes formed by the second and third directions (Y, X). Further, each of the main and auxiliary suspension arms 61, 62 is not provided with an air pressure bar.

Figure 6:
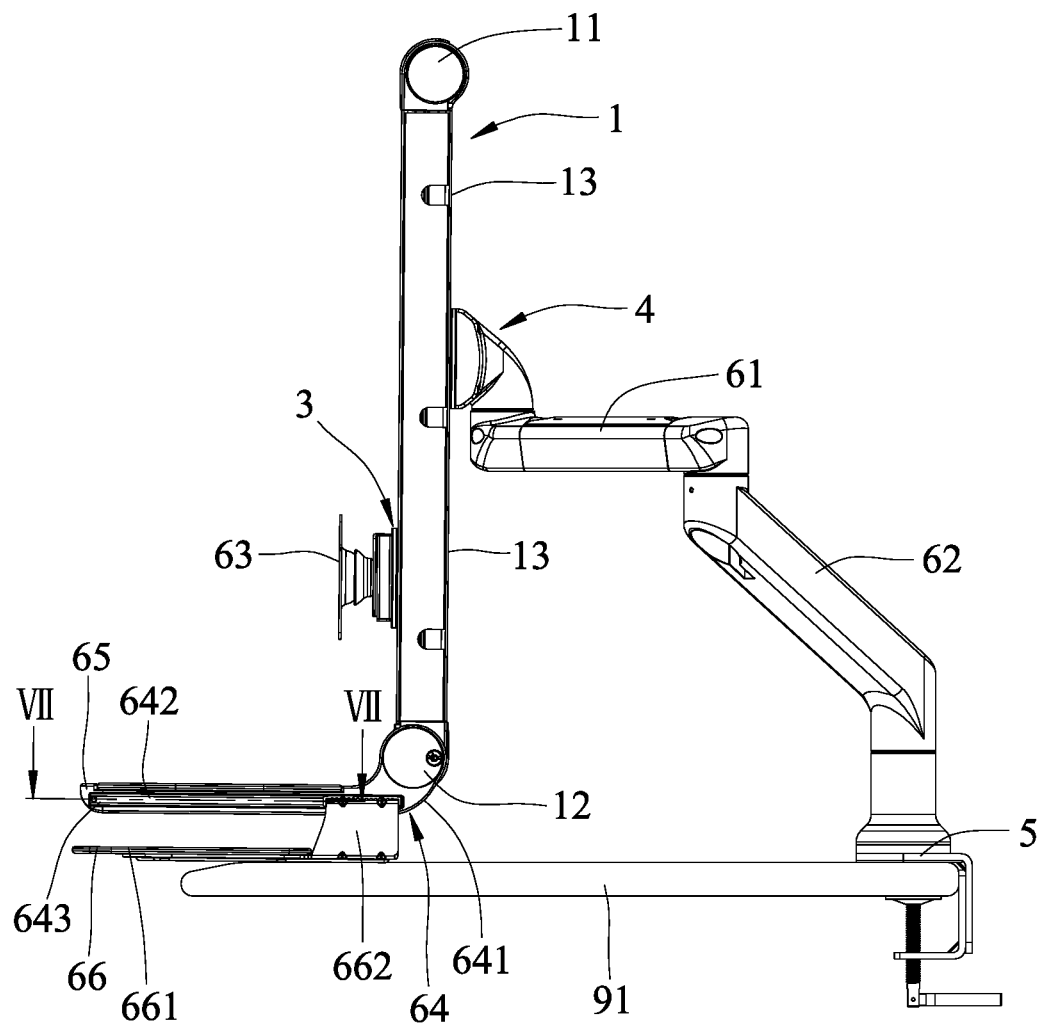
FIG. 6 is a view similar to FIG. 2, but illustrating a work platform being moved close to the tabletop.
Figure 7:
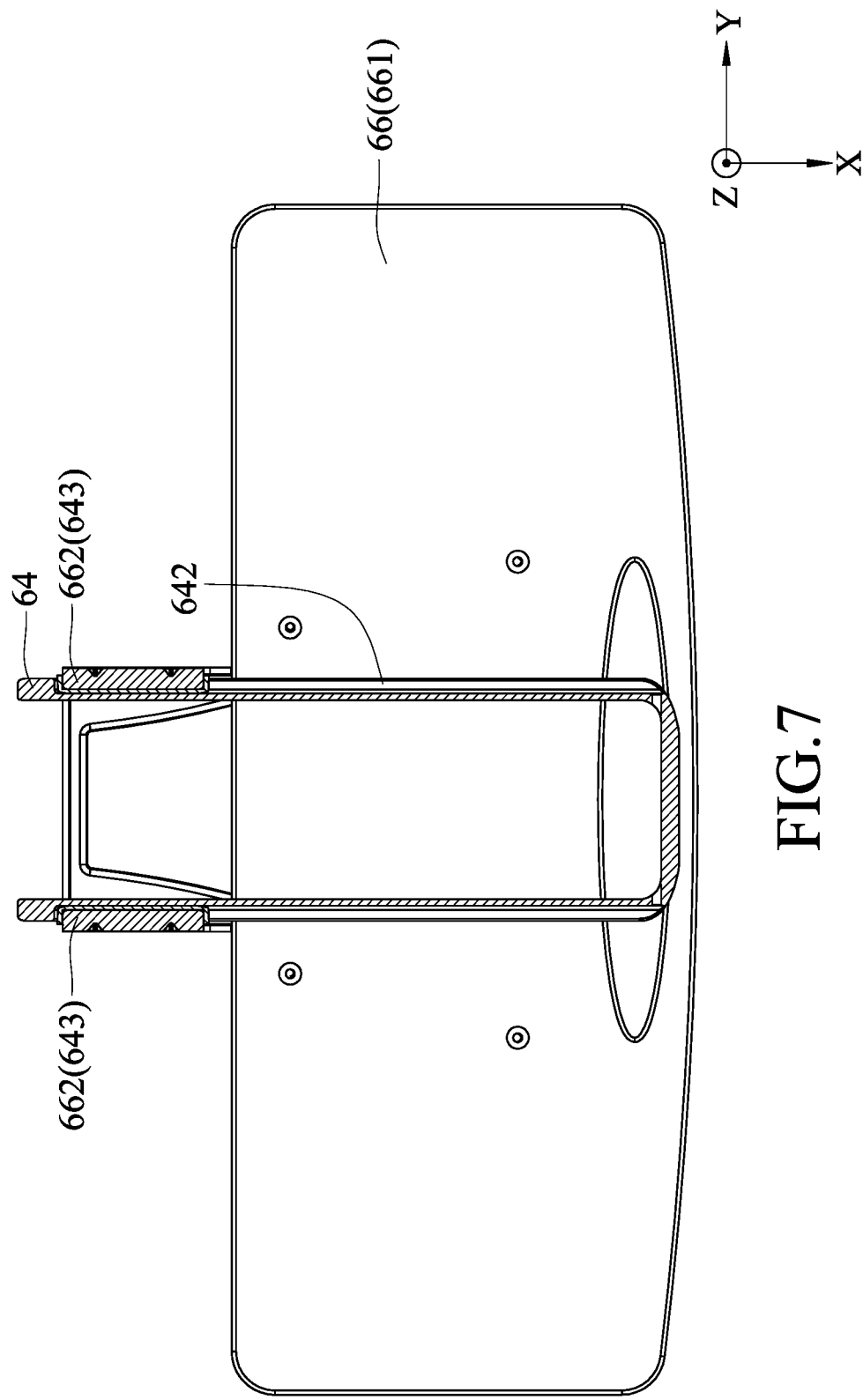
FIG. 7 is a sectional view of the first embodiment taken along line VII-VII of FIG. 6.

With reference to FIGS. 1, 6 and 7, the support device of this embodiment further includes a monitor mount 63 connected to the first slide seat 31 and configured to support the monitor 90, a pivot seat 64 pivotally connected to the lower member 12 of the upright frame 1, a work platform 65 disposed on the pivot seat 64, and a support platform 66 slidable relative to the work platform 65.

It is worth to mention herein that since the coiled portion 211 of the upper constant force spring 21 is rolled from a metal strip, when the upper constant force spring 21 is unwound and exceeds a constant force length, a constant winding force is generated through an internal stress of the metal strip. Generally speaking, the constant force length is defined as a length that is equal to 1.25 times an outer diameter of the coiled portion 211 prior to pulling of the free end 212 to unwind the upper constant force spring 21. Moreover, the constant winding force of the upper constant force spring 21 can be designed according to the load of both the monitor mount 63 and the monitor 90, for example, not larger than 5 kilograms.

The pivot seat 64 has a substantially L-shape, and includes a pivot portion 641 pivotally connected to the lower member 12, a pivot plate 642 extending from the pivot portion 641 away from the lower member 12, and a pair of slide rails 643 extending inwardly and respectively from two opposite side surfaces of the pivot plate 642. The pivot portion 641 has two rings 6411 respectively sleeved on two opposite sides of the lower member 12.

Figure 8:
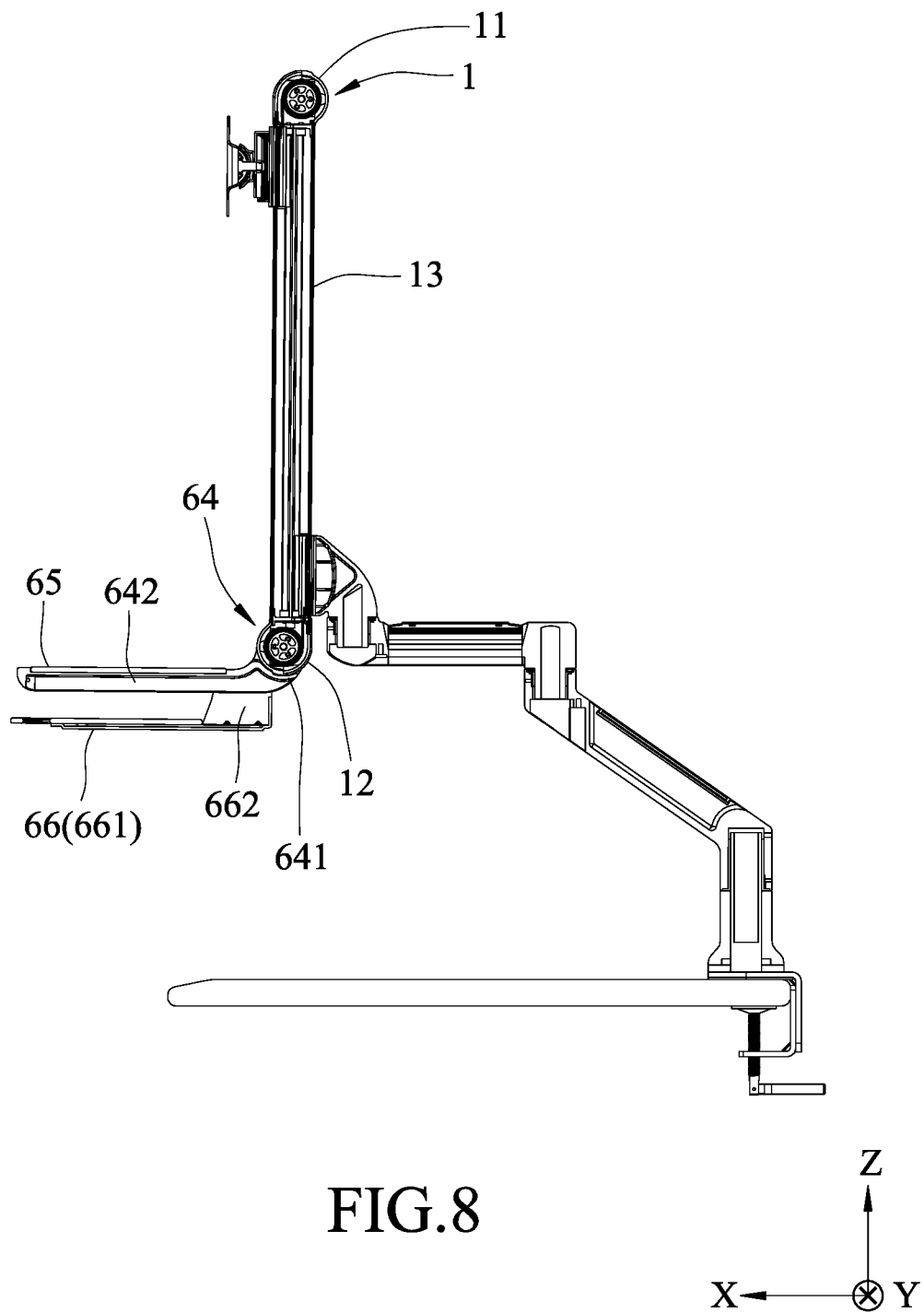
FIG. 8 is another schematic side view of the first embodiment, illustrating the work platform being moved away from the tabletop.
Figure 16:
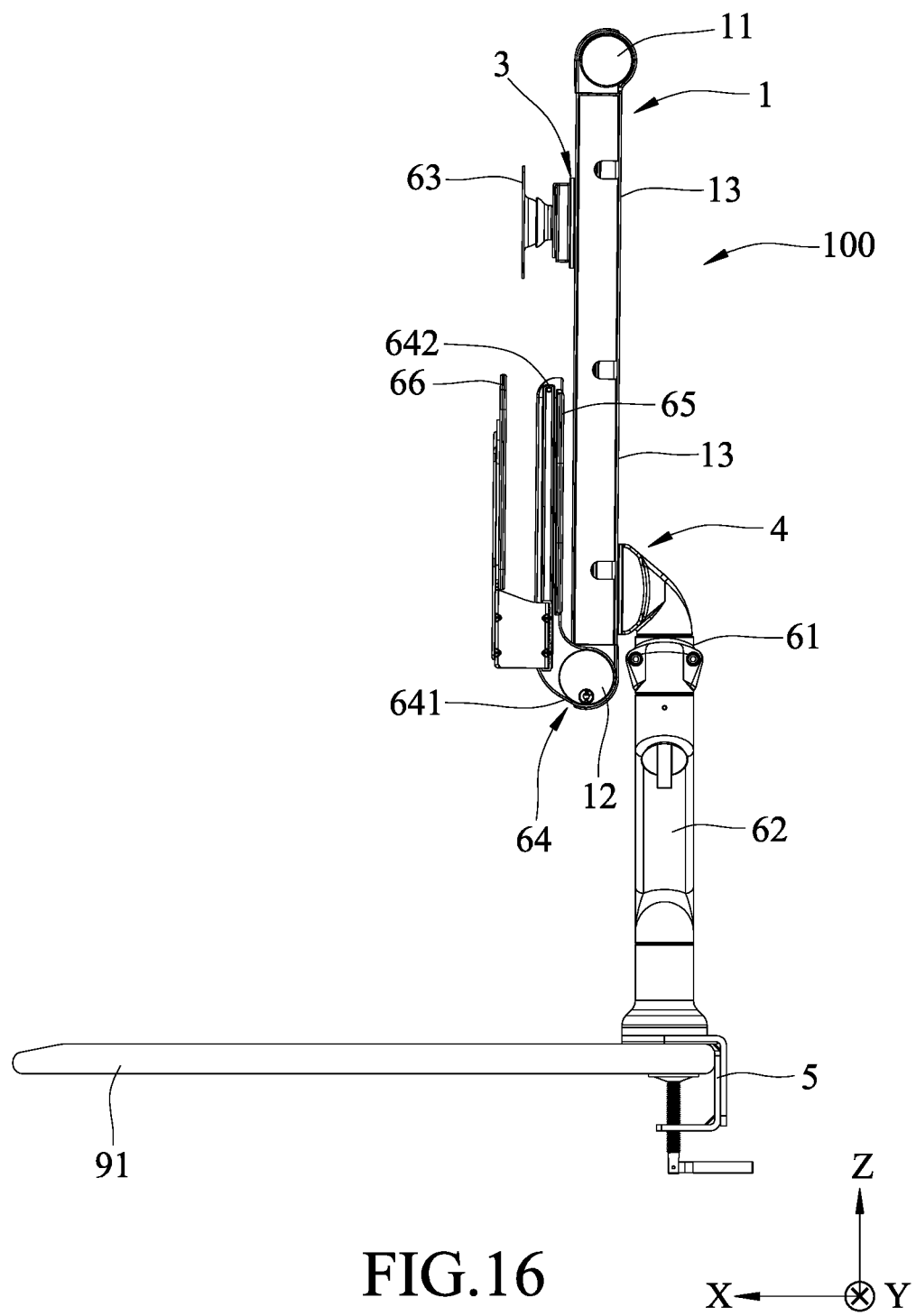
FIG. 16 is another schematic side view of the first embodiment, illustrating the work platform in a stored position.

The work platform 65 is fixed to a top surface of the pivot plate 642, and is rotatable relative to the upright frame body 13 through the pivot seat 64 between a use position, as shown in FIG. 8, and a stored position, as shown in FIG. 16. In the use position, the work platform 65 is perpendicular to the upright frame body 13, and a user can use the work platform 65, for example, for writing. In the stored position, the work platform 65 is parallel to the upright frame body 13.

Figure 9:
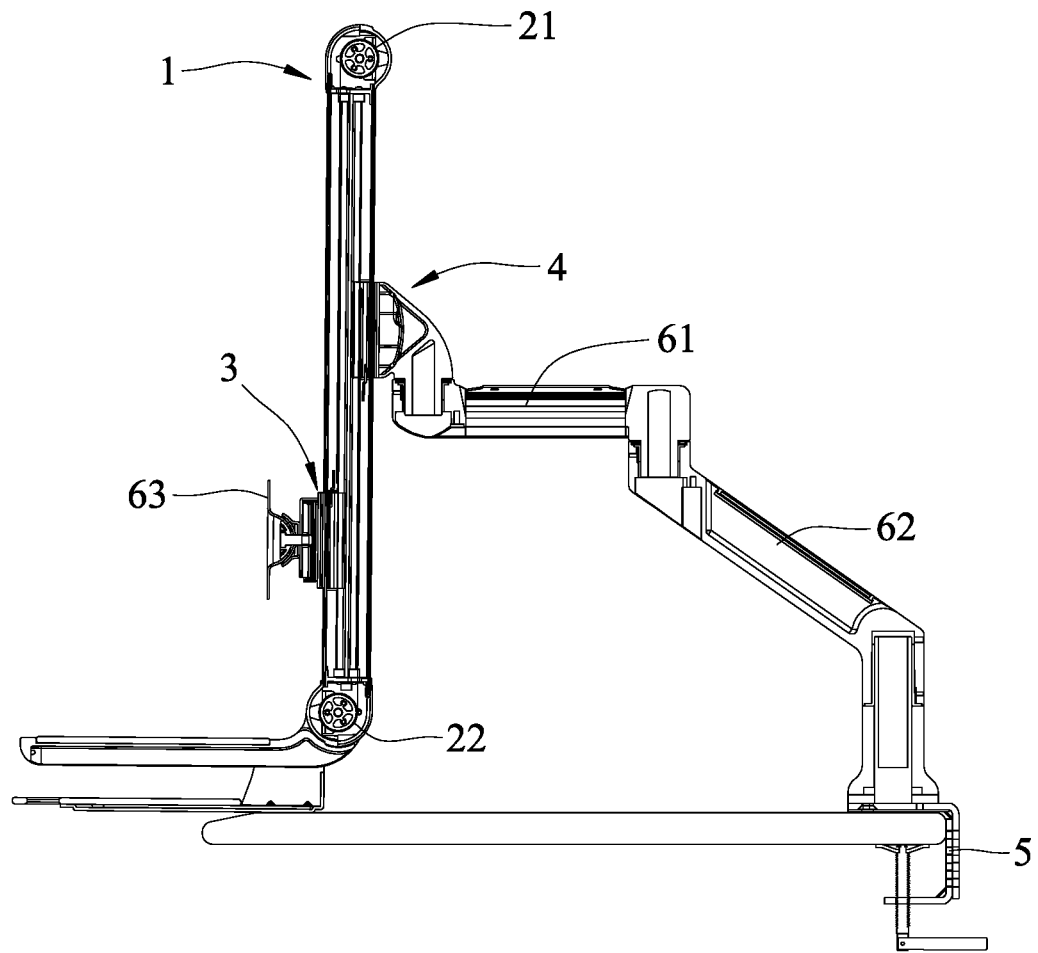
FIG. 9 is still another schematic side view of the first embodiment, illustrating the work platform being moved close to the tabletop and a monitor mount being moved away from an upper member of an upright frame.

The support platform 66 has a flat plate 661 configured to support a keyboard (not shown), and a pair of spaced-apart positioning plates 662 extending outwardly from the flat plate 661 and engaged respectively and slidably with the pair of slide rails 643. Through this, the support platform 66 is slidable relative to the work platform 65 along the third direction (X) between an exposed position, as shown in FIGS. 1 and 2, and an unexposed position, as shown in FIGS. 8 and 9. In the exposed position, the support platform 66 is spaced apart from the work platform 65, and the positioning plates 662 are distal from the pivot portion 641. In the unexposed position, the support platform 66 is below and parallel to the work platform 65, and the positioning plates 662 are proximate to the pivot portion 641. Further, the support platform 66 can move along with the work platform 65 when the work platform 65 is moved to the stored position.

In use, the clamping seat 5 is first fixedly clamped onto the tabletop 91, after which the support device 100 is unfolded to a completely expanded state, as shown in FIG. 2. At this time, the work platform 65 is spaced apart from the tabletop 91, and is thus suitable for use by a user when standing. If the support platform 66 is not required, the support platform 66 is directly pushed to slide to the unexposed position (see FIG. 8). Further, if the user intends to use the embodiment while sitting on a chair (not shown), he/she can simply pull the upright frame 1 to move downward relative to the second slide unit 4 along the first direction (Z) (see FIG. 6).

Since the lower constant force spring 22 can generate a constant winding force when it exceeds its constant force length during unwinding, the upright frame 1 can be arbitrarily stopped at a height or level required by the user. Further, because the lower constant force spring 22 itself has a restoring force that biases the second slide unit 4 to move close to the lower member 12 of the upright frame 1, and because there is relative sliding movement between the upright frame 1 and the second slide unit 4, the user can move the upright frame 1 upward and away from the tabletop 91 with ease and without much effort to counter the attraction of the gravity force against the upright frame 1. Similarly, because the upper constant force spring 21 can generate a constant winding force when it exceeds its constant force length during unwinding, the monitor 63 attached to the first slide seat 31 can be arbitrarily stopped at a height or level required by the user. Further, because the upper constant force spring 21 itself has a restoring force that biases the first slide unit 3 to move close to the upper member 11 of the upright frame 1, it is also easy for the user to move the monitor 63 upward toward the upper member 11 without much effort. Thus, an effort-saving effect can be achieved.

Figure 17:
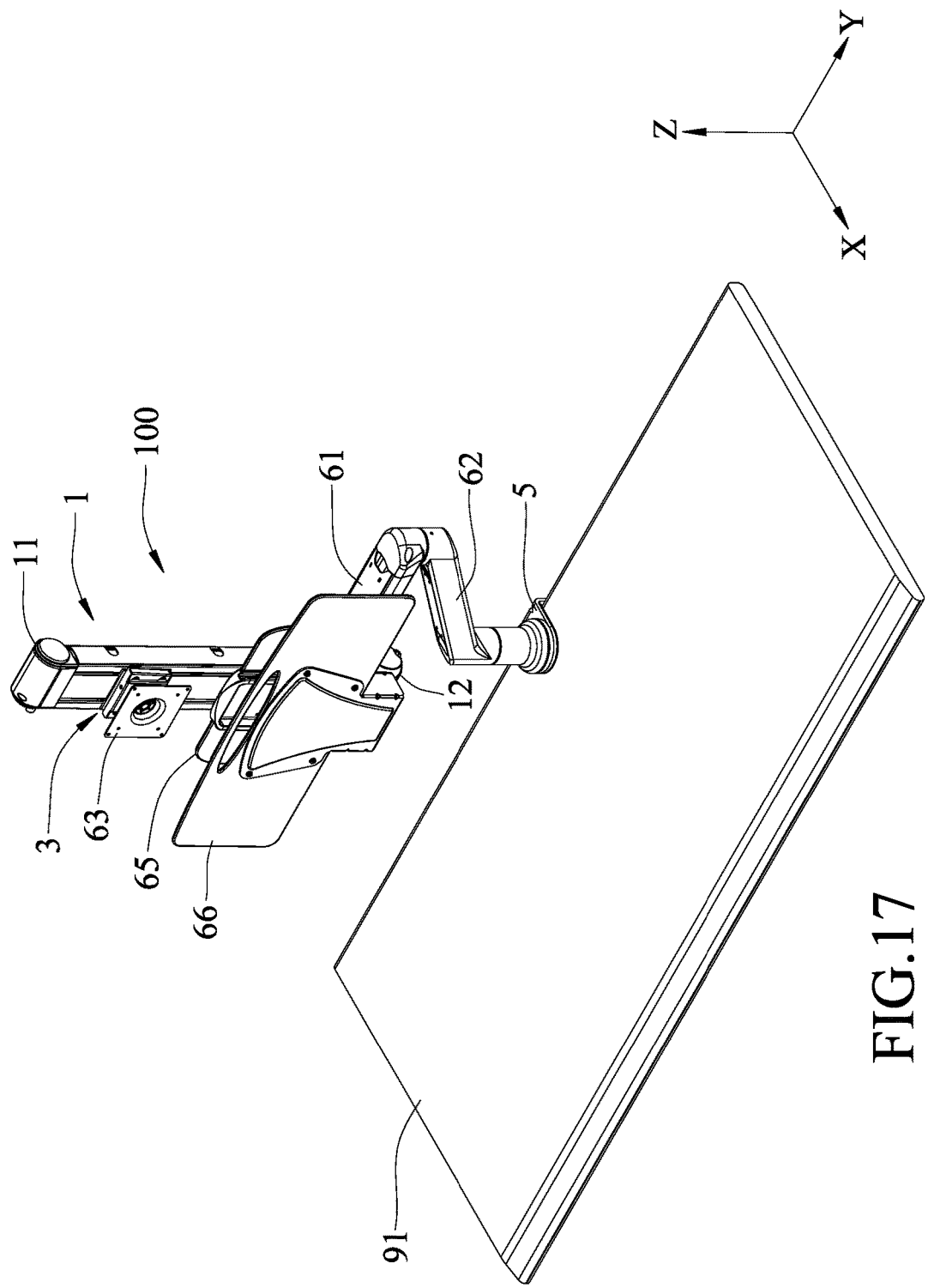
FIG. 17 is a perspective view of the first embodiment clamped on the tabletop in a complete folded state.
Figure 18:
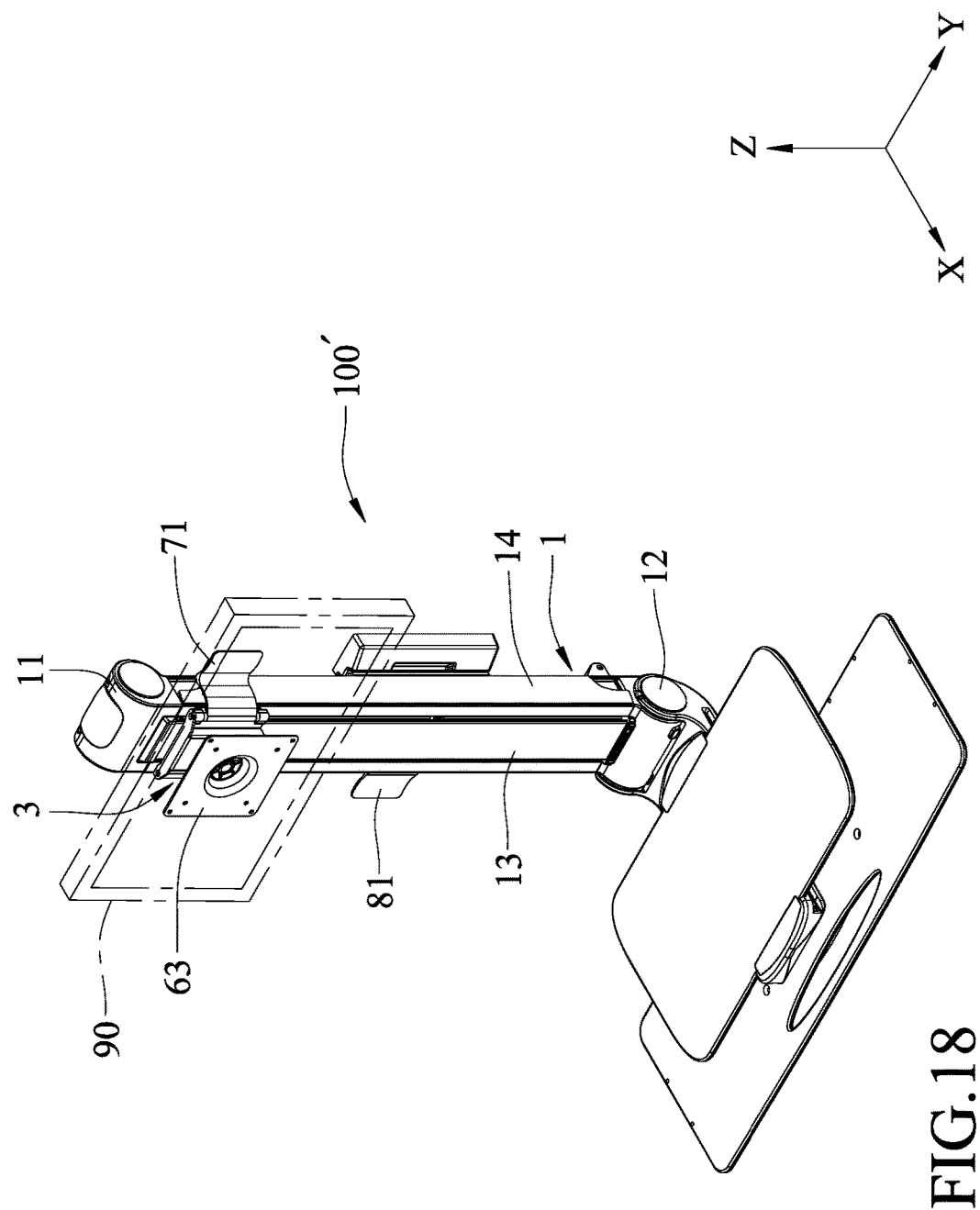
FIG. 18 is a perspective view of a support device according to the second embodiment of the present disclosure configured to support a monitor.

When use of the support device 100 is not required, the work platform 65 is moved to the stored position along with the support platform 66 which is in the unexposed position, after which the user separately rotates the main suspension arm 61 and the auxiliary suspension arm 62 so as to move the upright frame 1 close to the clamping seat 5. The support device 100 of this embodiment is in a complete folded state at this time, as shown in FIGS. 16 and 17.

From the aforesaid disclosure, the advantages of the support device 100 of this embodiment can be summarized as follows:

1. Through the characteristics of each of the upper and lower constant force springs 21, 22 which can generate a constant winding force when it exceeds a constant force length during unwinding, the monitor mount 63 and the work platform 65 can be arbitrarily stopped at a height or level required by the user. Further, through the inherent restoring forces of the upper and lower constant force springs 21, 22, the monitor mount 63 can be moved upward along the upright frame 1 and the lower member 12 of the upright frame 1 can be moved close to the second slide seat 41 with ease. As such, the upper and lower constant force springs 21, 22 of this disclosure can replace the air pressure bars of the prior arts. Moreover, the prices of the upper and lower constant force springs 21, 22 are cheaper than those of the air pressure bars, and many sorts of sizes and weights of the constant force springs are available in the market for a user to choose from, so that the overall manufacturing cost of the disclosure can be effectively reduced.

2. If the work platform 65 and the support platform 66 are not required, the work platform 65 is rotated to the stored position along with the unexposed support platform 66 through the pivot seat 64, thereby achieving a space-saving effect.

3. Since the first protrusion 311 is in slidable contact with the first protective member 33 when moving up and down in the first slide grooves 133 and the second protrusion 411 is in slidable contact with the second protective member 43 when moving up and down in the second slide grooves 134, abrasion and wear of the first and second protrusions 311, 411 can be reduced, thereby prolonging the service life thereof.

Referring to FIGS. 18 to 21, the second embodiment of the support device 100' of this disclosure is shown to be identical to the first embodiment. Particularly, the upright frame 1 includes the upright frame body 13, the upper member 11, the lower member 12 and the two side covers 14. The upright frame body 13 includes the side walls 131, the intermediate wall 132, the first slide grooves 133, and the second slide grooves 134. However, in this embodiment, the upright frame body 13 further includes two first inner walls 15 that are parallel to the intermediate wall 132, that are adjacent to the second slide plate 313 and that cooperatively define a first guide groove 151 extending along the first direction (Z), two first connecting walls 16 each of which is connected between one of the first inner walls 15 and the intermediate wall 132, two second inner walls 17 that are parallel to the intermediate wall 132, that are located between the second slide grooves 134 and that cooperatively define a second guide groove 171 extending along the first direction (Z), and two second connecting walls 18 each of which is connected between one of the second inner walls 17 and the intermediate wall 132.

The structures of the upper and lower constant force springs 21, 22 are similar to those described in the first embodiment. Particularly, each of the upper and lower constant force springs 21, 22 is configured as a rolled metal strip, and includes the coiled portion 211, 221 and the free end 212, 222.

The first slide unit 3 similarly includes the first slide seat 31 disposed on one side of the intermediate wall 132, and the upper connecting piece 32 having two ends respectively connected to the top portion of the first slide seat 31 and the free end 212 of the upper constant force spring 21. Specifically, a bottom end of the upper connecting piece 32 is fixed to the top portion of the first slide seat 31 by a screw bolt 92 which is disposed in and which is slidable upward and downward along the first guide groove 151.

Figure 19:
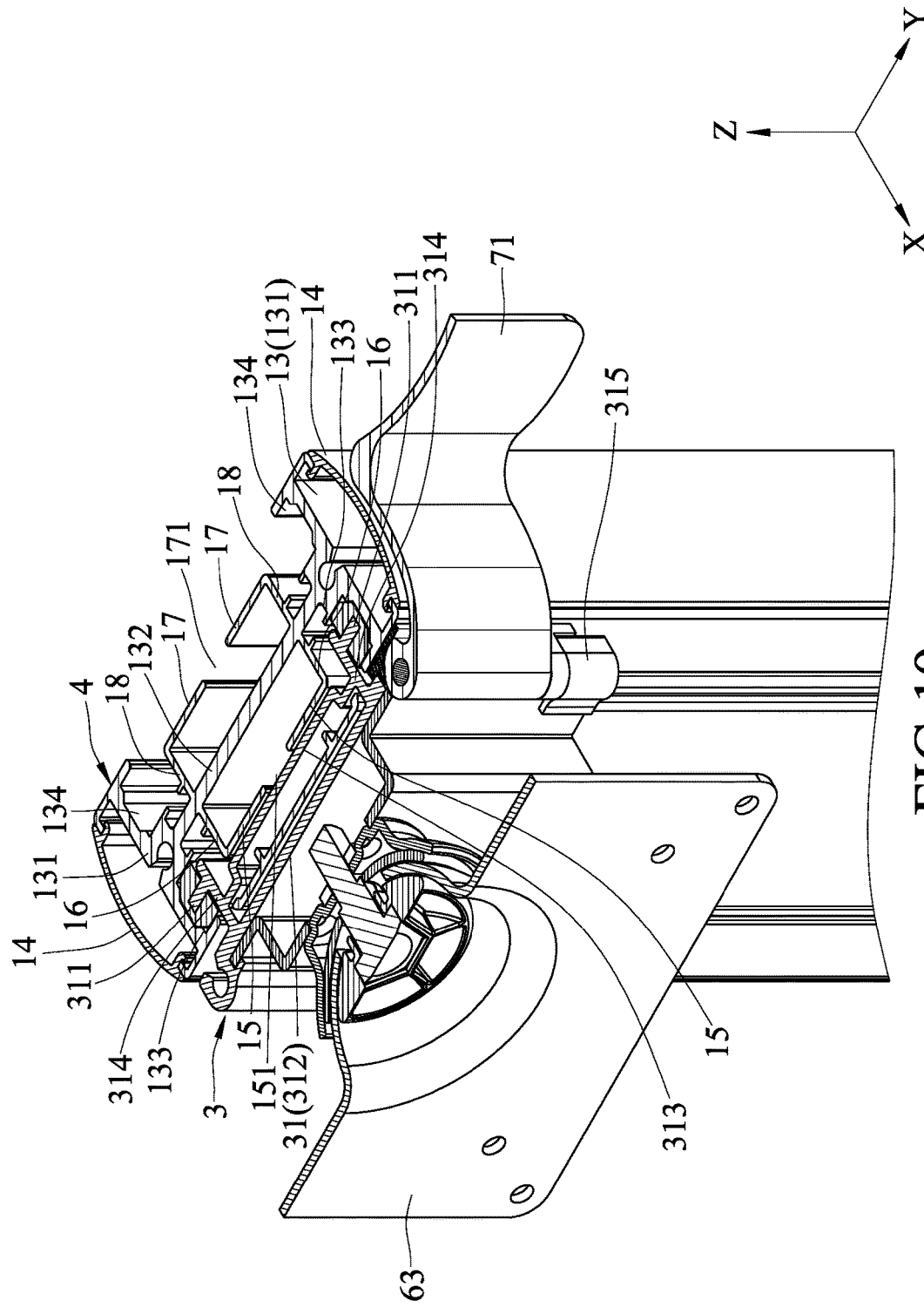
FIG. 19 is an enlarged fragmentary partly sectional view of the second embodiment, illustrating a connection relation among an upright frame body of an upright frame, a first slide seat, and a first locking unit.
Figure 20:
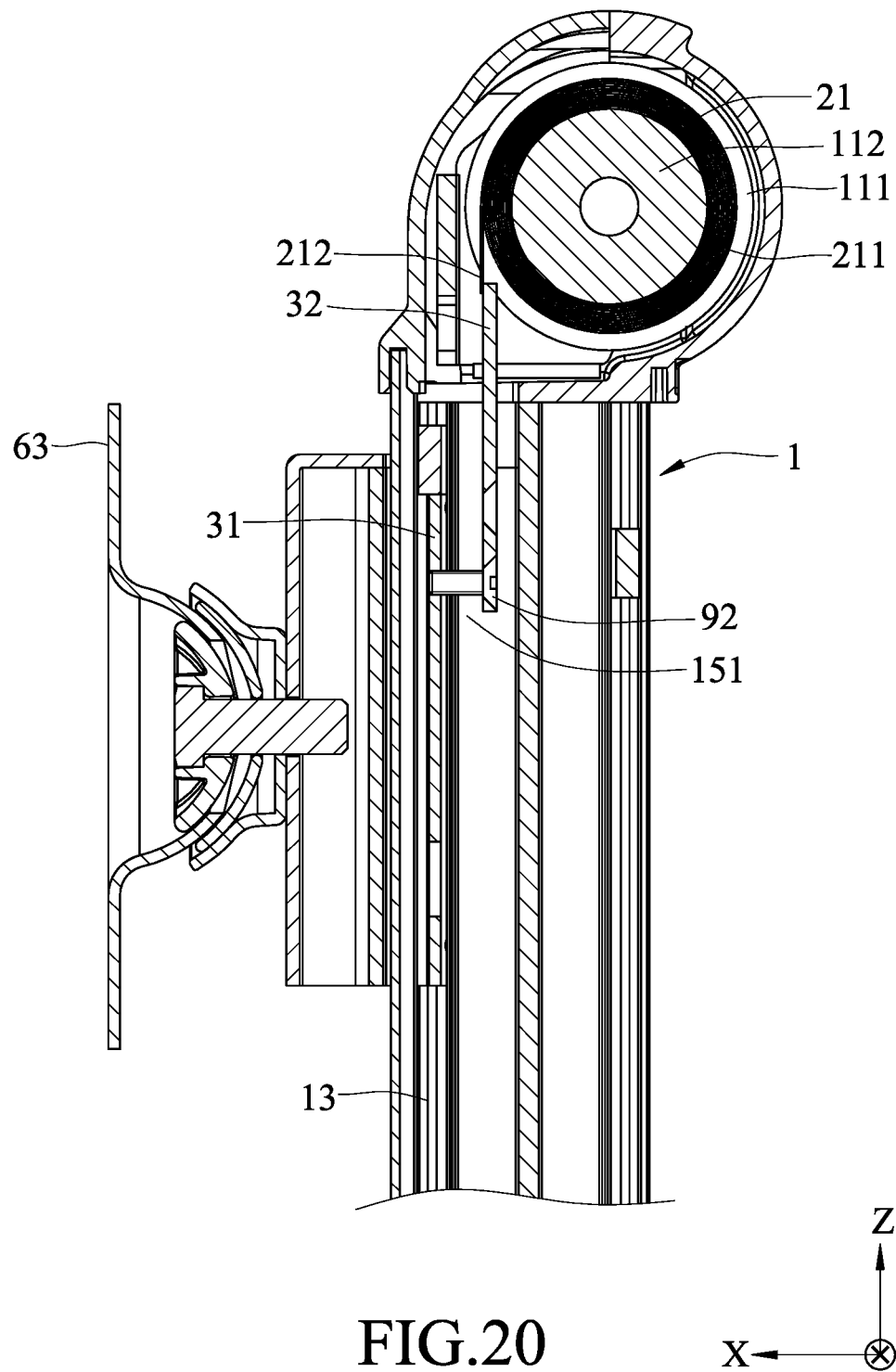
FIG. 20 is an enlarged fragmentary sectional view of the second embodiment, illustrating how an upper connecting piece is connected to the first slide seat by a screw bolt.
Figure 22:
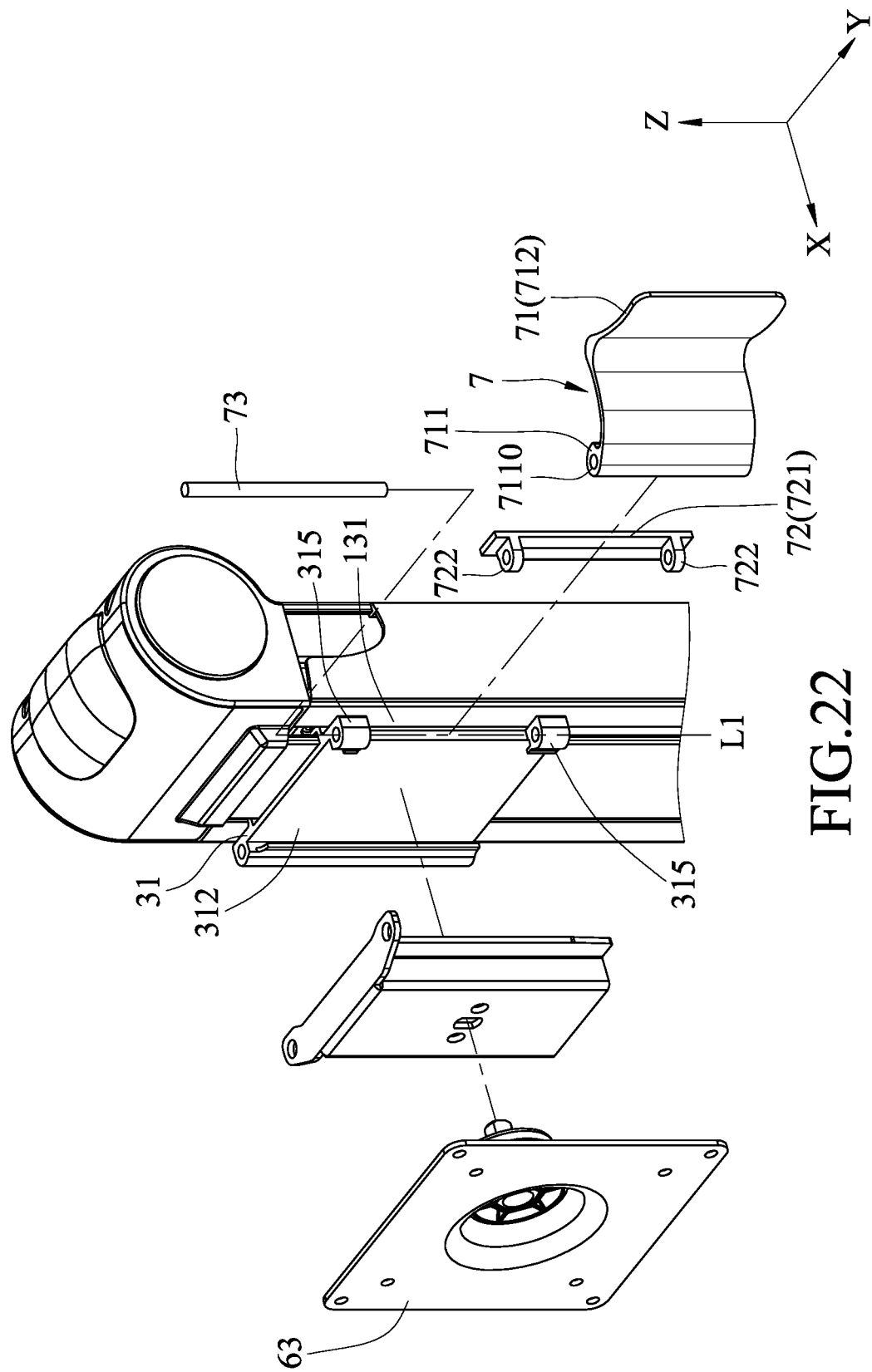
FIG. 22 is an exploded perspective view of a first locking unit and a monitor mount of the second embodiment prior to connection with the first slide seat.
Figure 23:
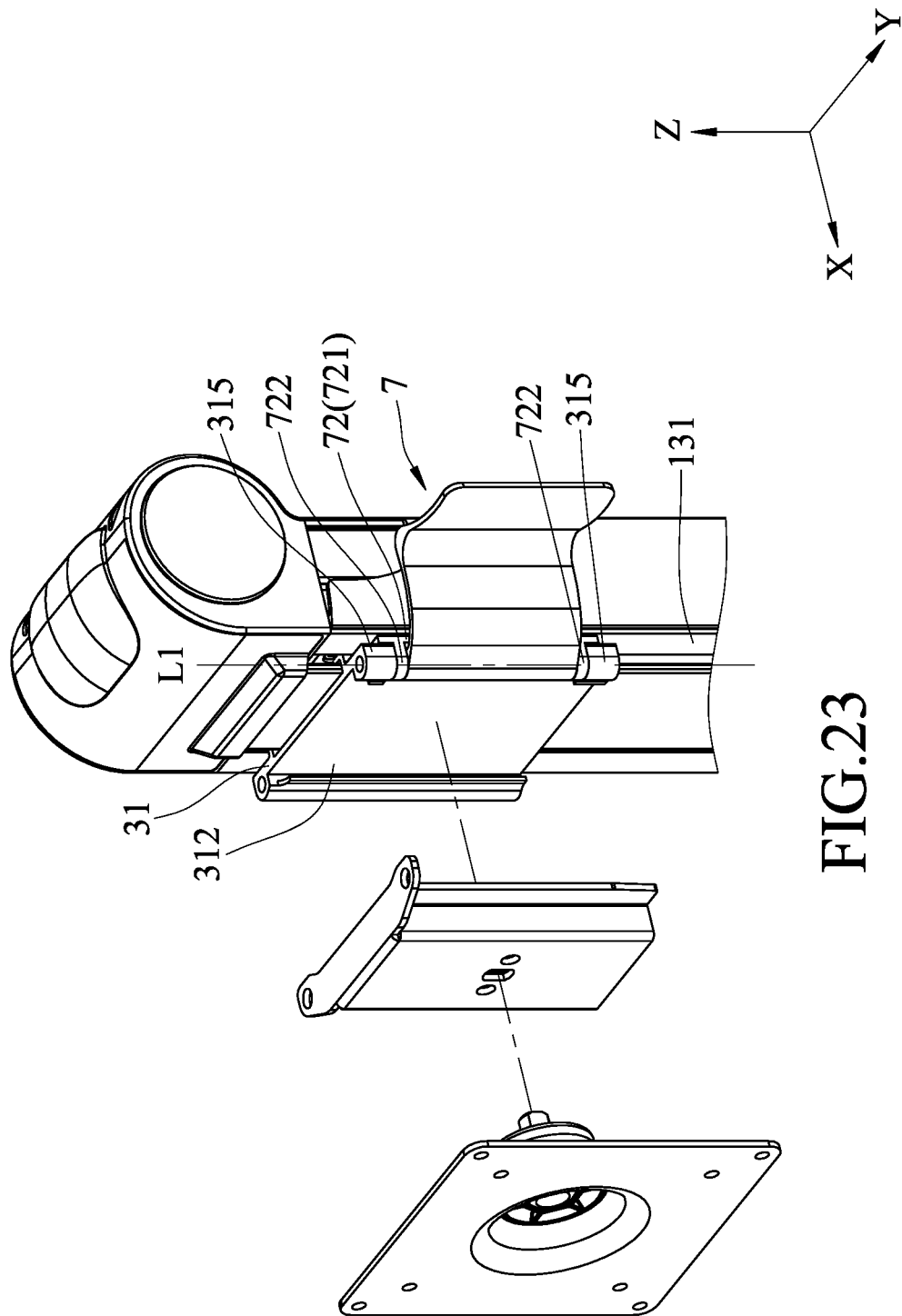
FIG. 23 illustrates the first locking unit connected to the first slide seat.

Referring to FIGS. 19, 22 and 23, in this embodiment, the first slide seat 31 further includes two first tubular rods 315 connected to one side of the first side plate 312 opposite to one of the first connecting plates 314 and spaced apart from each other in a top-bottom direction along a first axial line (L1) parallel to the first direction (Z).

Figure 21:
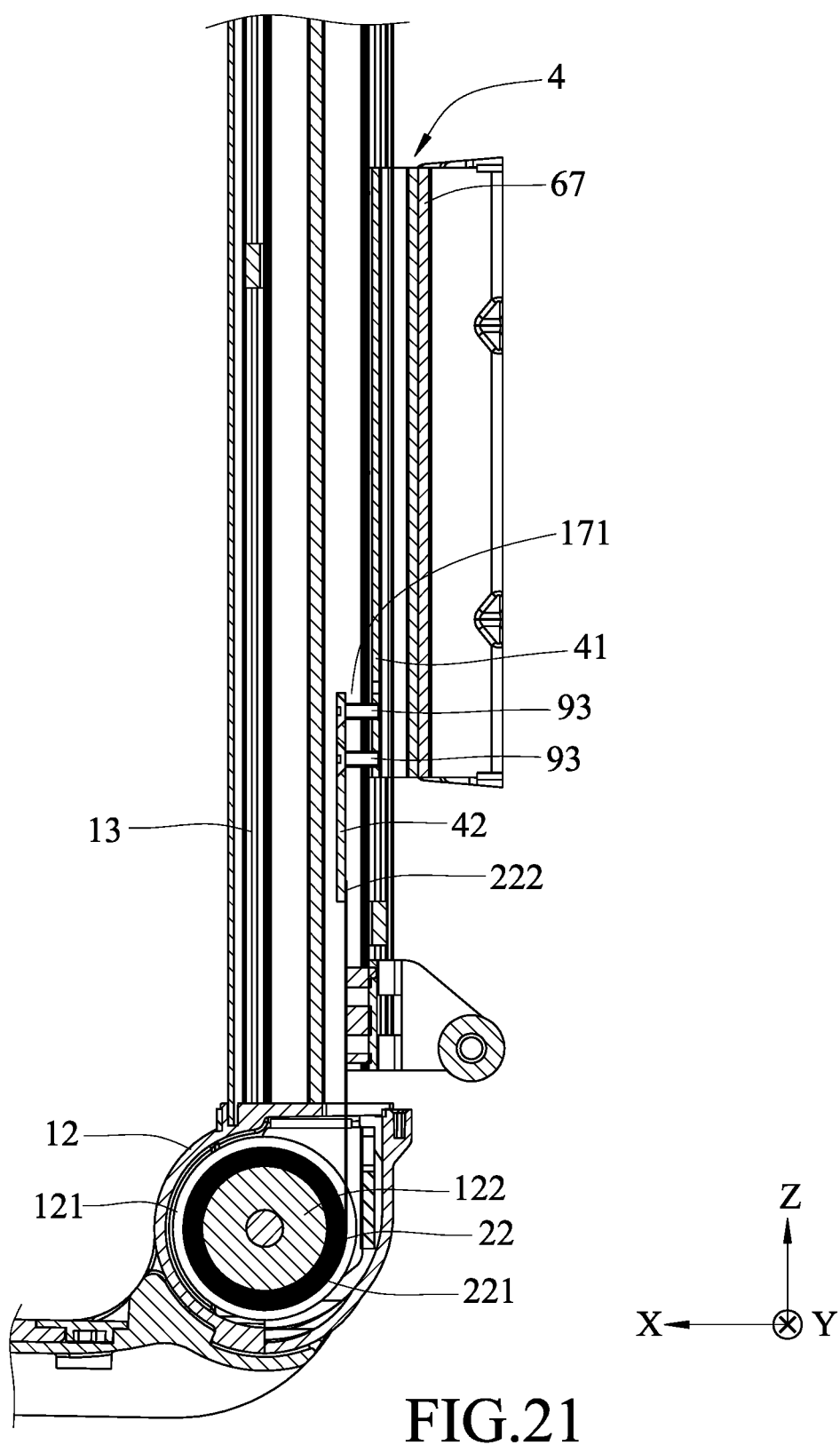
FIG. 21 is another enlarged fragmentary sectional view of the second embodiment, illustrating how a lower connecting piece is connected to a second slide seat by a screw bolt.
Figure 25:
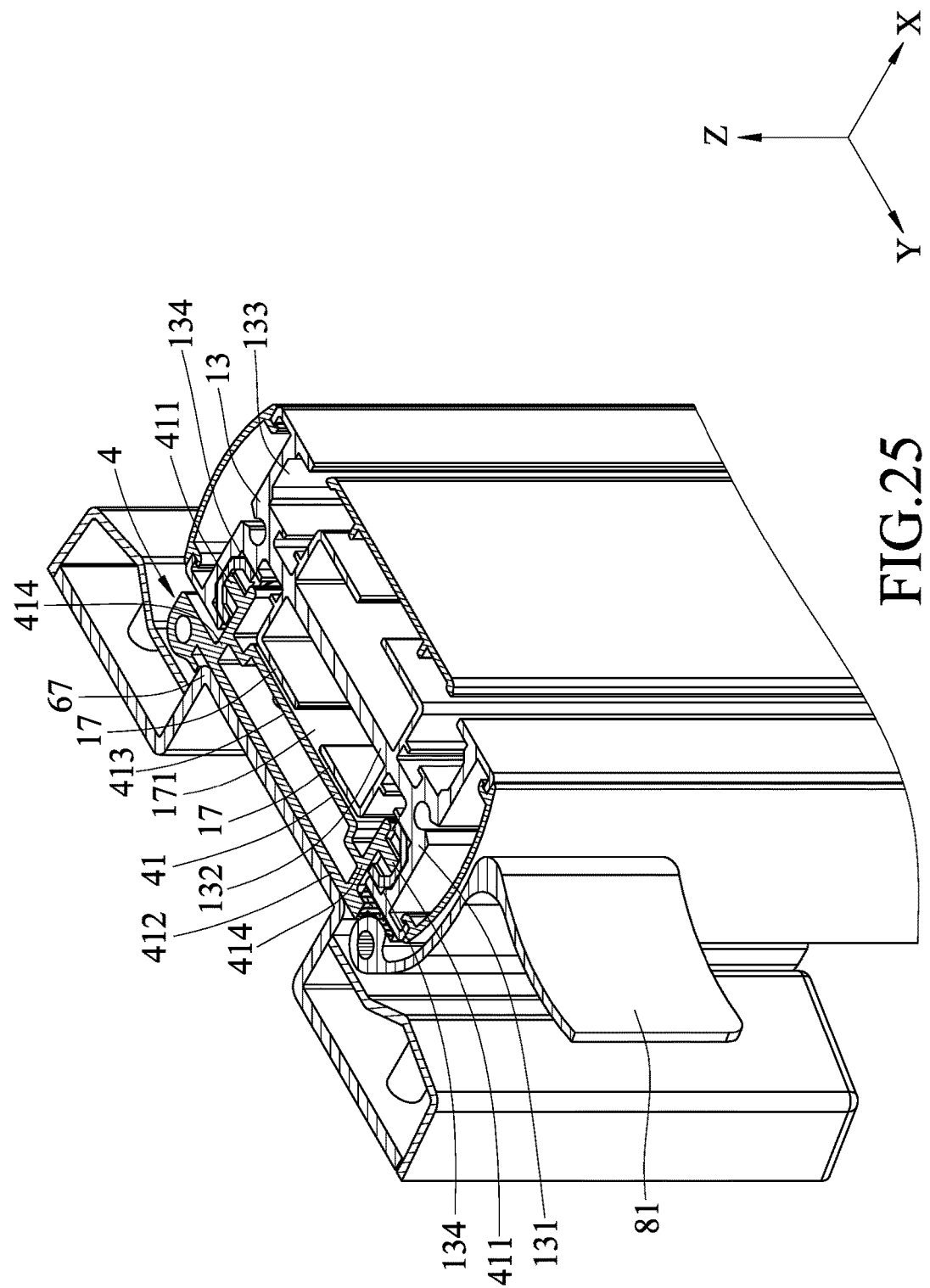
FIG. 25 is another enlarged fragmentary partly sectional view of the second embodiment, illustrating a connection relation among the upright frame body of the upright frame, the second slide seat, and a second locking unit.

Referring to FIGS. 21, 24 and 25, the second slide unit 4 is similarly slidably mounted on the upright frame body 13 opposite to the first slide unit 3, and includes the second slide seat 41 disposed on the opposite side of the intermediate wall 132, and the lower connecting piece 42 having two ends respectively connected to the bottom portion the second slide seat 41 and the free end 222 of the lower constant force spring 22. A top end of the lower connecting piece 42 is fixed to the bottom portion of the second slide seat 41 by two screw bolts 93 which are disposed in and which are slidable upward and downward along the second guide groove 171. It should be noted herein that since there is relative sliding movement between the upright frame 1 and the second slide unit 4, when the second slide unit 4 is connected to a mounting seat 67 and is then fixed to a wall panel (not shown), the upright frame body 13 is slidable upward and downward relative to the second slide unit 4 along the first direction (Z).

Referring to FIGS. 24 to 27, in this embodiment, the second slide seat 41 further includes two second tubular rods 416 connected to one side of the first side plate 412 opposite to one of the second connecting plates 414 and spaced apart from each other along a second axial line (L2) parallel to the first direction (Z).

The monitor mount 63 is similarly connected to the first slide seat 31, and is configured to mount the monitor 90.

The support device 100 of this embodiment further includes a first locking unit 7 pivoted to the first tubular rods 315, and a second locking unit 8 pivoted to the second tubular rods 416.

Figure 28:
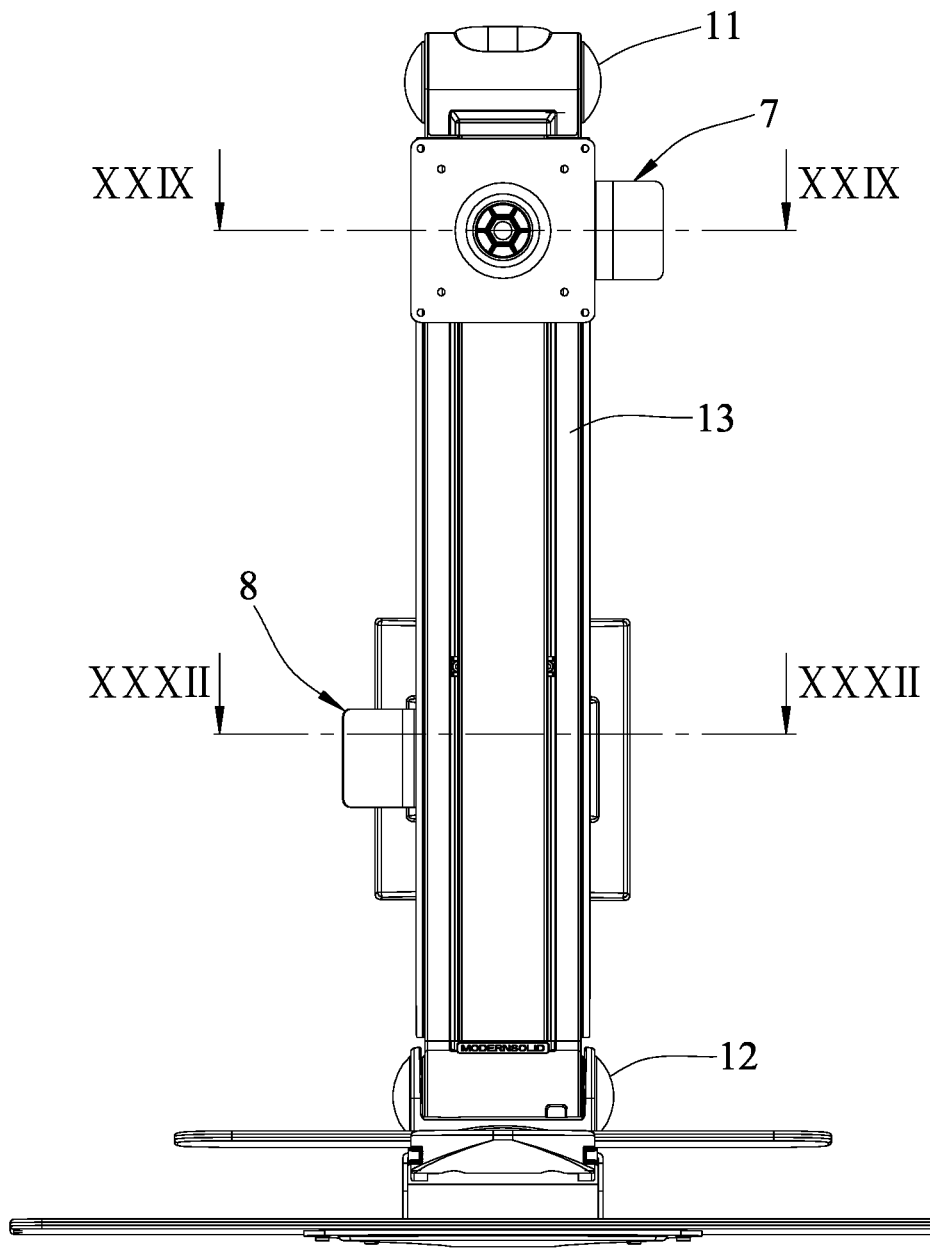
FIG. 28 is a schematic front view of the second embodiment.
Figure 29:
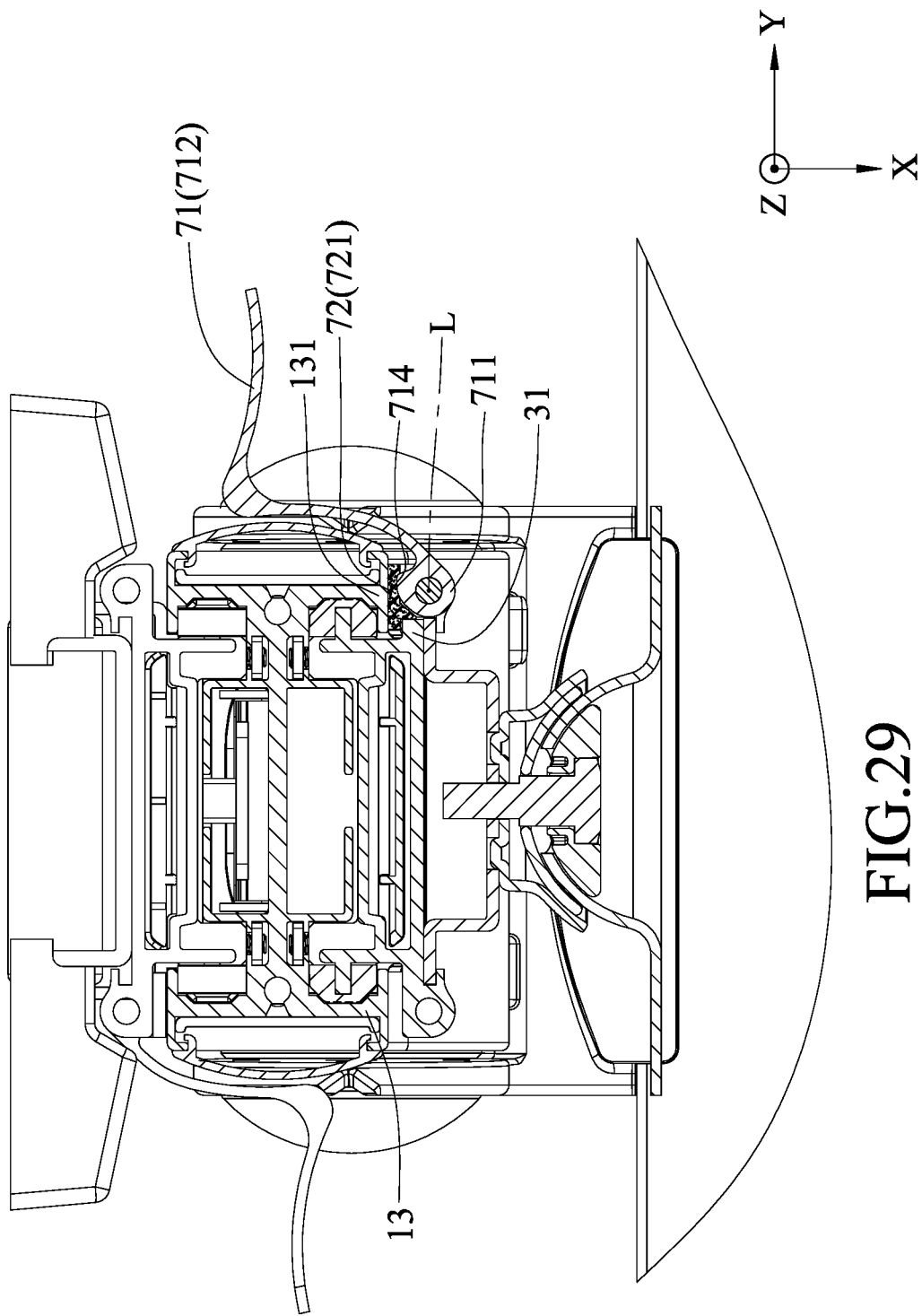
FIG. 29 is a sectional view of the second embodiment taken along line XXIX-XXIX of FIG. 28.
Figure 30:
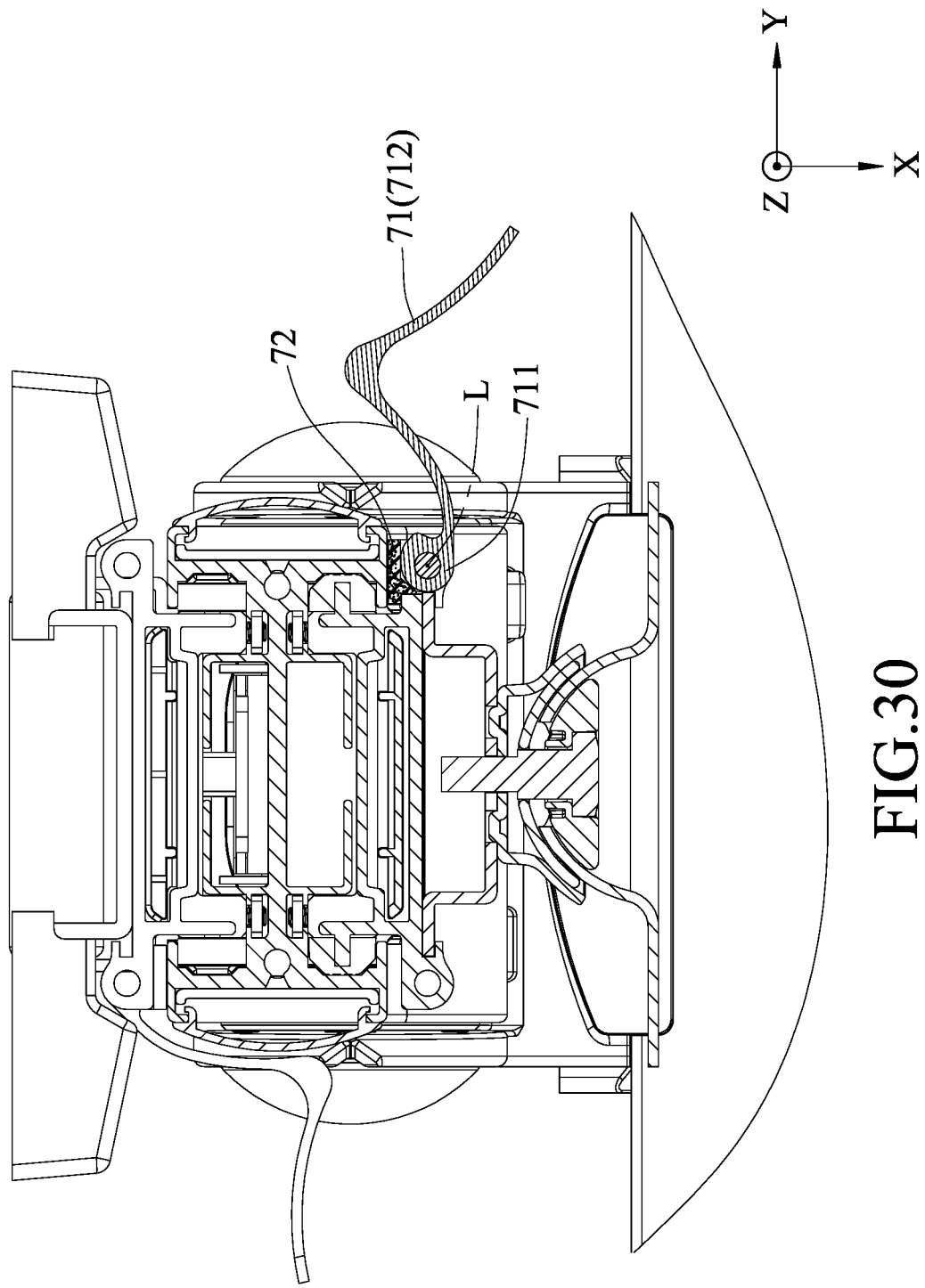
FIG. 30 is a view similar to FIG. 29, but illustrating the first locking unit in a non-locking position and the second locking unit in a locking position.
Figure 31:
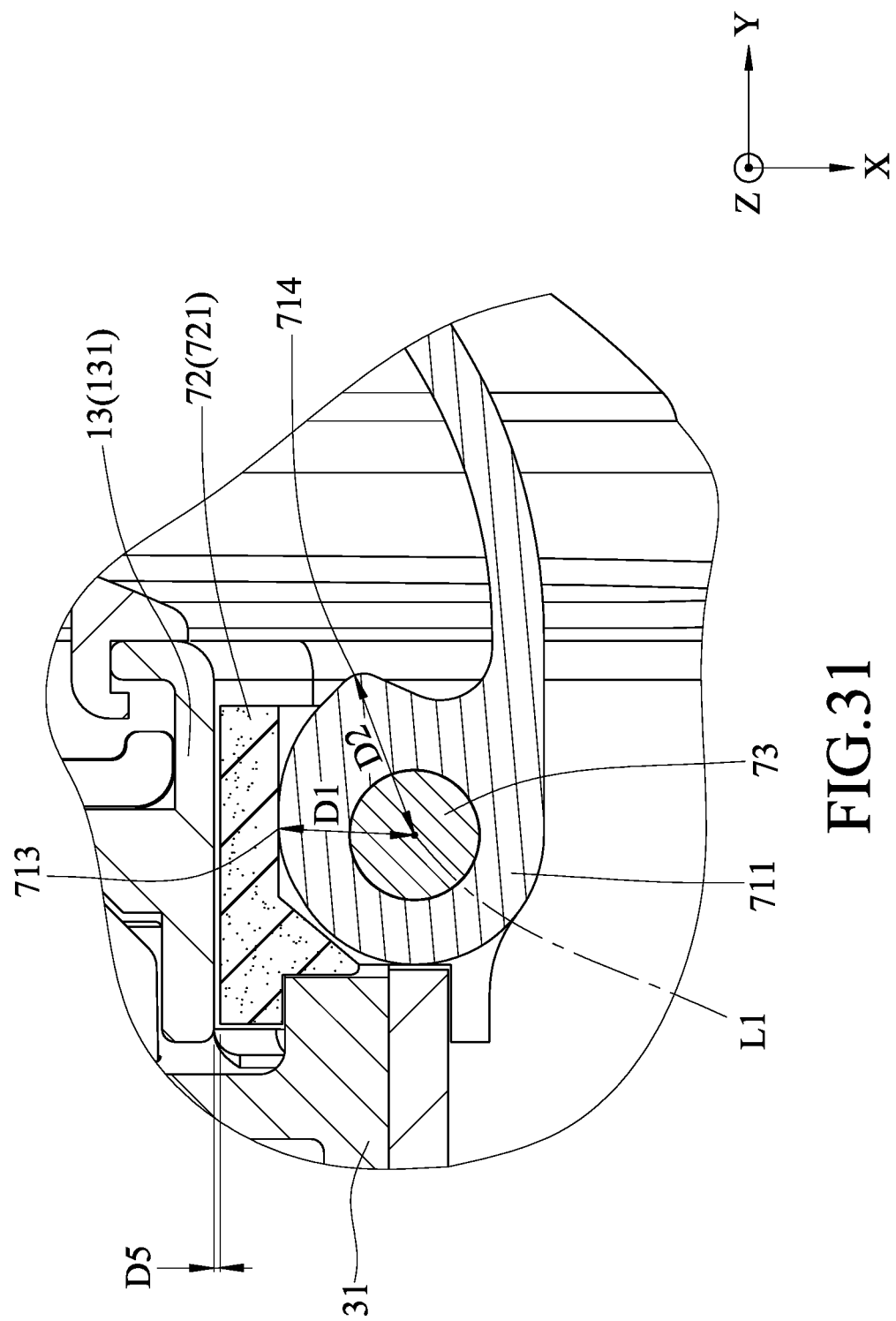
FIG. 31 is an enlarged fragmentary schematic view of FIG. 29, illustrating a gap formed between a first packing member and an adjacent side wall.

Referring to FIGS. 28 to 30, in combination with FIGS. 22 and 23, the first locking unit 7 includes a first pull member 71, a first packing member 72 and a first pivot rod 73. The first pull member 71 includes a first cam portion 711 disposed between the first tubular rods 315, and a first pull portion 712 connected to the first cam portion 711 and configured to drive rotation of the first cam portion 711. Referring to FIG. 31, the first cam portion 711 defines a first pivot hole 7110 extending along the first axial line (L1), and has an outer surface 713 and a first lobe 714 protruding therefrom. The outer surface 713 is spaced apart from the first axial line (L1) by a distance (D1) which is smaller than a distance (D2) from the first lobe 714 to the first axial line (L1).

The first packing member 72 includes a first elastic body 721 disposed between the first tubular rods 315 and one of the side walls 131 and in contact with the first cam portion 711, and two first lug portions 722 that protrude from one side of the first elastic body 721, that are spaced apart from each other along the first axial line (L1) and that are located on top and bottom sides of the first cam portion 711. The first packing member 72 can be made of a deformable elastomeric material, such as rubber.

The first pivot rod 73 is inserted into the first tubular rods 315, the first pivot hole 7110 and the first lug portions 722. Through this, the first pull member 71 is operable to rotate relative to the first tubular rods 315 between a locking position and a non-locking position. In the locking position, as shown in FIG. 29, the first lobe 714 pushes and squeezes the first elastic body 721 to abut tightly against the one of the side walls 131, thereby positioning the first slide seat 31 on the upright frame body 13. In the non-locking position, as shown in FIGS. 30 and 31, a gap (D5) is formed between the first elastic body 721 and the one of the side walls 131, so that the first slide seat 31 is movable upward and downward relative to the upright frame body 13.

Figure 26:
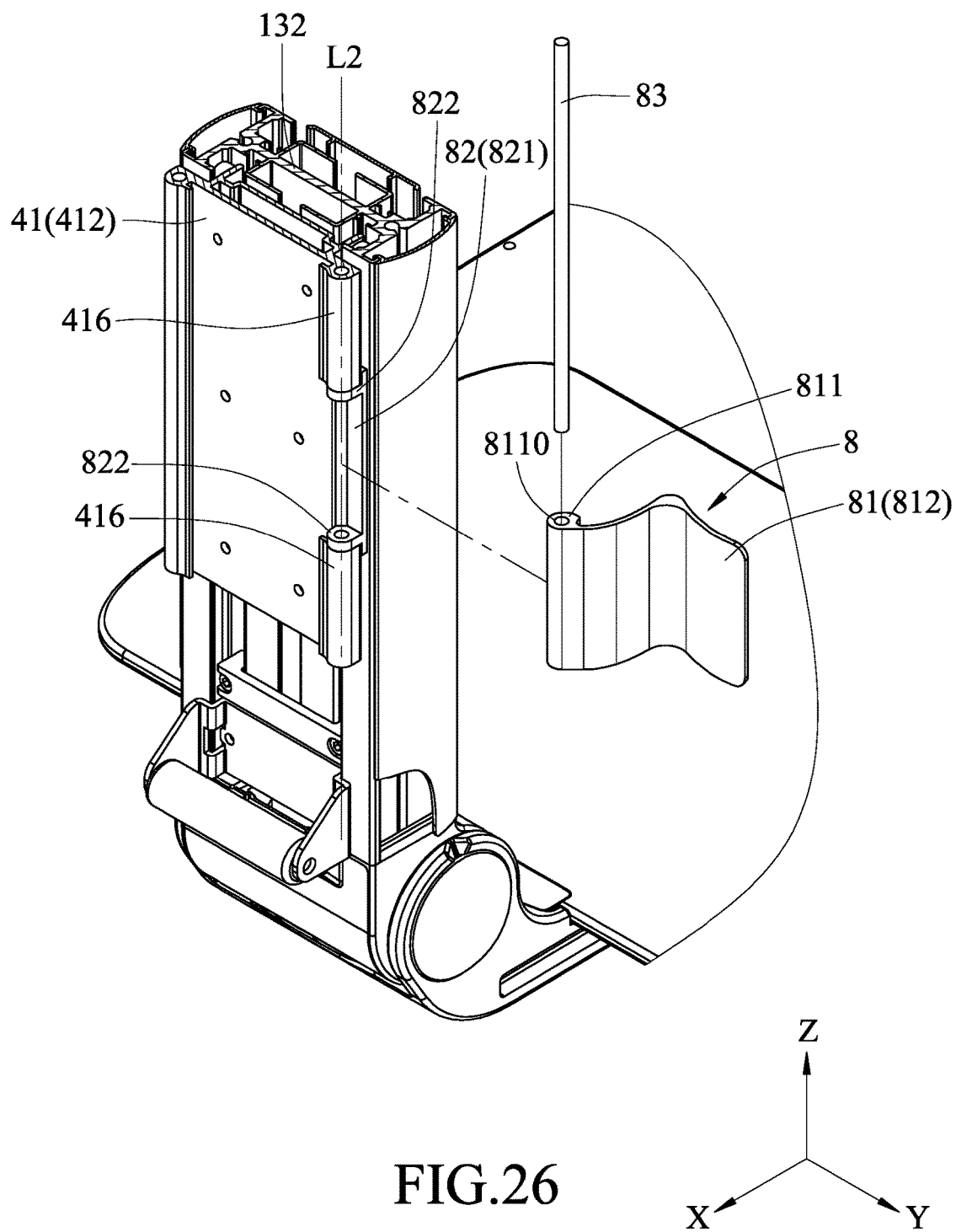
FIG. 26 is still another enlarged fragmentary sectional view of the second embodiment, illustrating a second pull member and a second pivot rod of the second locking unit prior to connection with the second slide seat.
Figure 27:
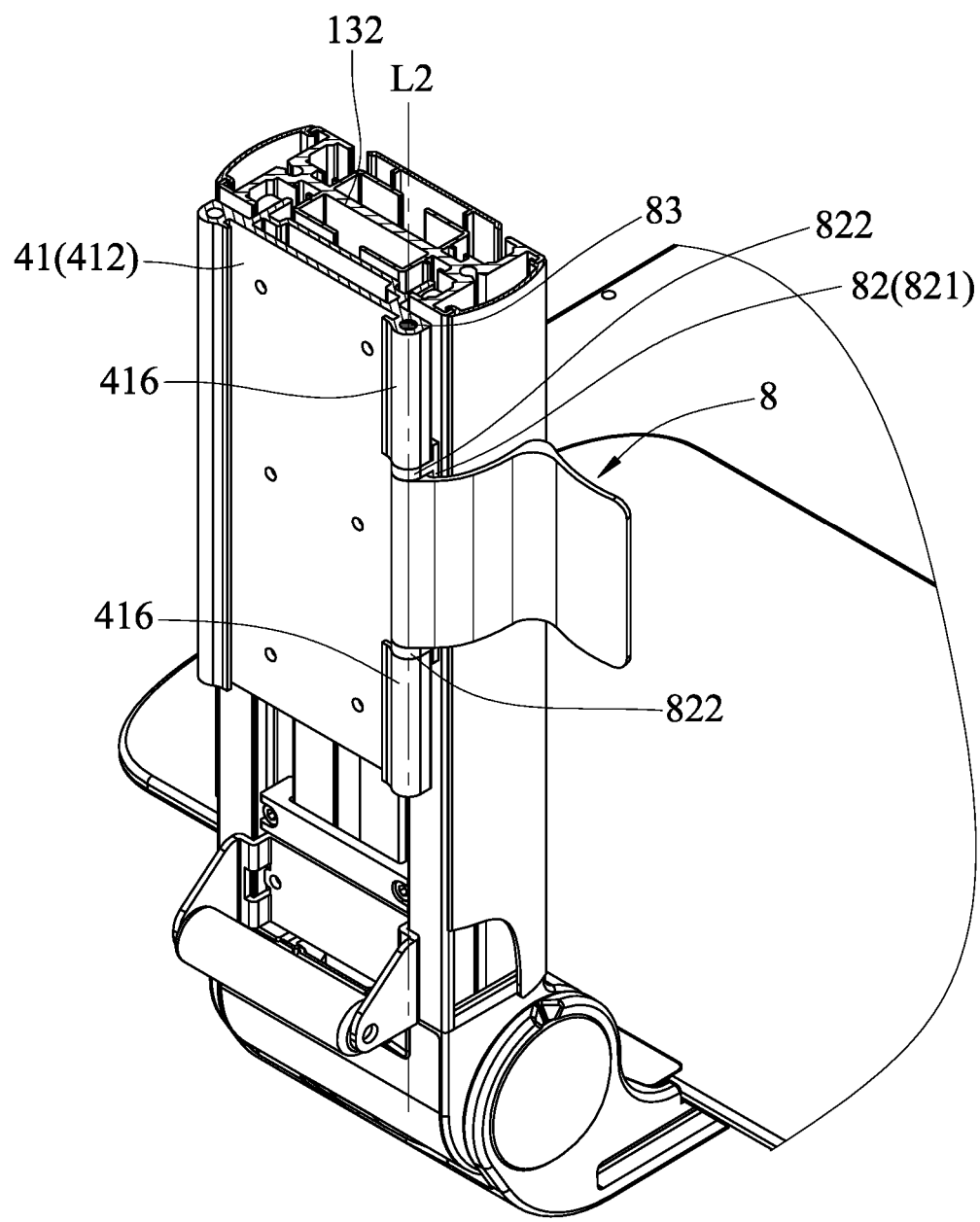
FIG. 27 illustrates the second pull member and the second pivot rod of the second locking unit connected to the second slide seat.
Figure 32:
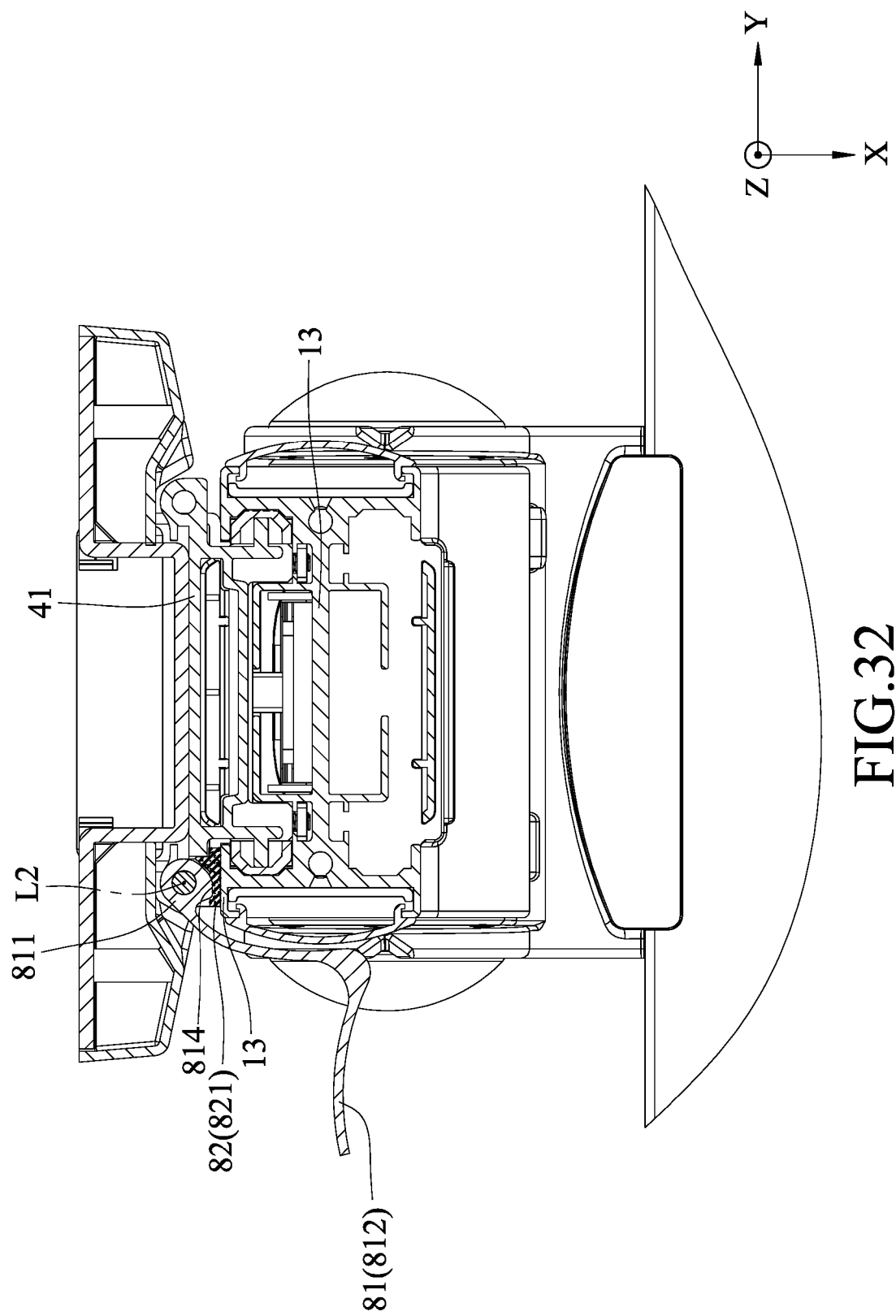
FIG. 32 is a sectional view of the second embodiment taken along line XXXII-XXXII of FIG. 28.
Figure 33:
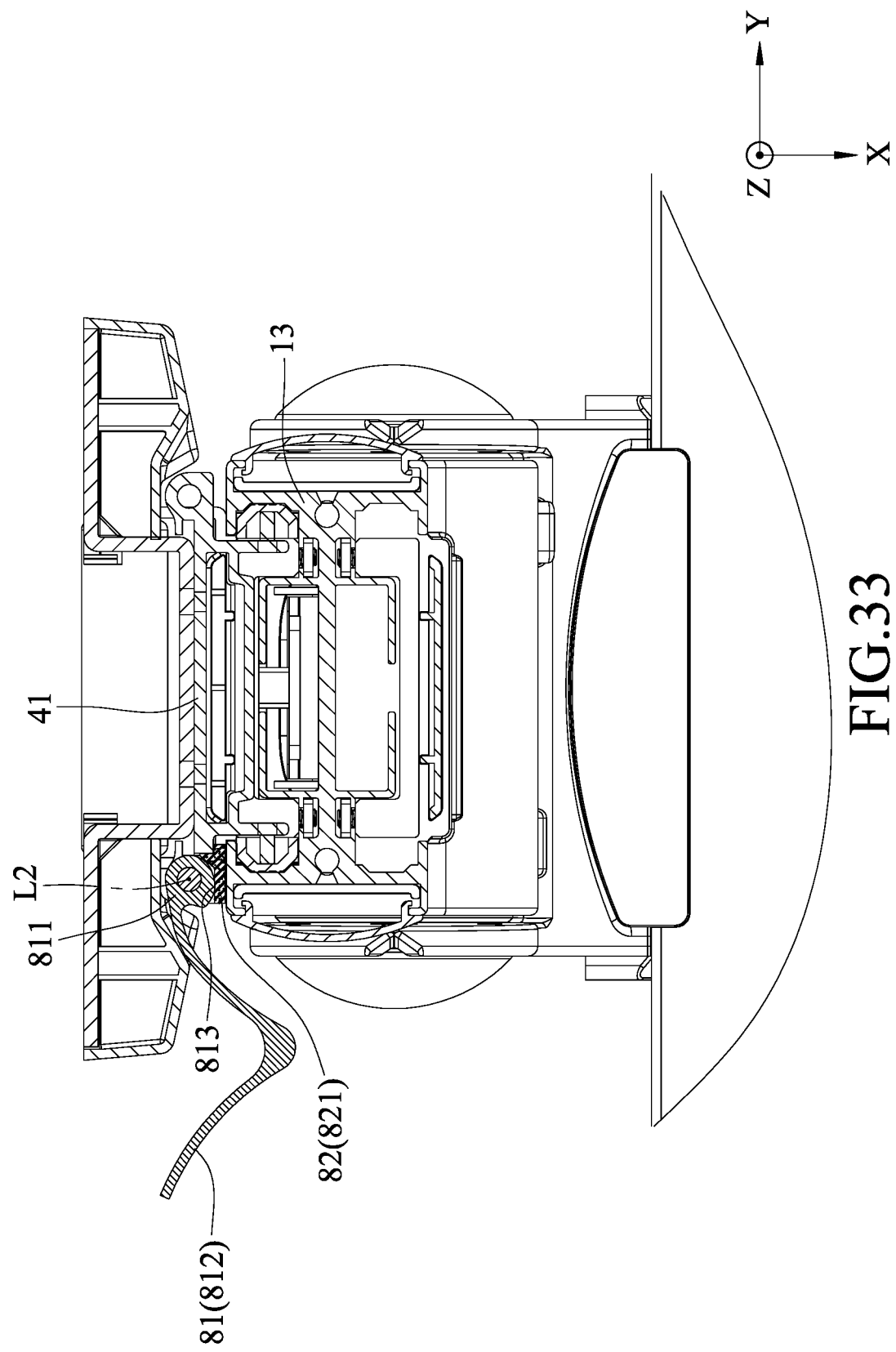
FIG. 33 is a view similar to FIG. 32, but illustrating the second locking unit in a non-locking position.
Figure 34:
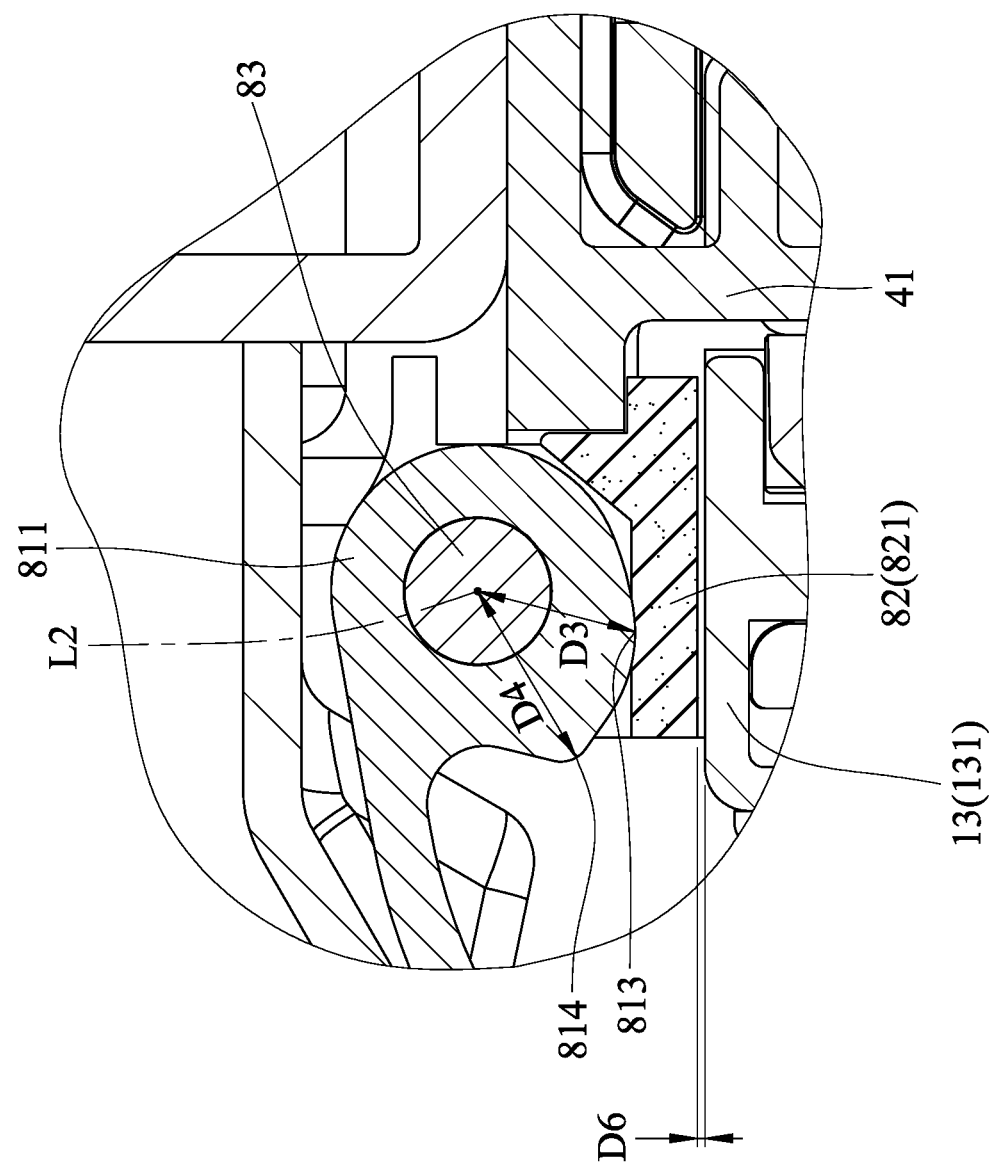
FIG. 34 is an enlarged fragmentary schematic view of FIG. 33, illustrating a gap formed between a second packing member and an adjacent side wall.

Referring to FIGS. 32 and 33, in combination with FIGS. 26 and 28, the second locking unit 8 includes a second pull member 81, a second packing member 82 and a second pivot rod 83. The second pull member 81 includes a second cam portion 811 disposed between the second tubular rods 416, and a second pull portion 812 connected to the second cam portion 811 and configured to drive rotation of the second cam portion 811. Referring to FIG. 34, the second cam portion 811 defines a second pivot hole 8110 extending along the second axial line (L2), and has an outer surface 813 and a second lobe 814 protruding therefrom. The outer surface 813 is spaced apart from the second axial line (L2) by a distance (D3) which is smaller than a distance (D4) from the second lobe 814 to the second axial line (L2).

The second packing member 82 includes a second elastic body 821 disposed between the second tubular rods 416 and the other one of the side walls 131 and in contact with the second cam portion 811, and two second lug portions 822 that protrude from one side of the second elastic body 821, that are spaced apart from each other along the second axial line (L2) and that are located on top and bottom sides of the second cam portion 811. The second packing member 82 can also be made of a deformable elastomeric material, such as rubber.

The second pivot rod 83 is inserted into the second tubular rods 416, the second pivot hole 8110 and the second lug portions 822. Through this, the second pull member 81 is operable to rotate relative to the second tubular rods 416 between a locking position and a non-locking position. In the locking position, as shown in FIG. 32, the second lobe 814 pushes and squeezes the second elastic body 821 to abut tightly against the other one of the side walls 131, thereby positioning the second slide seat 41 on the upright frame body 13. In the non-locking position, as shown in FIGS. 33 and 34, a gap (D6) is formed between the second elastic body 821 and the other one of the side walls 131, so that the second slide seat 41 and the upright frame body 13 are movable relative to each other along the first direction (Z).

In use, when the first pull member 71 is moved to the non-locking position, as shown in FIGS. 30 and 31, the outer surface 713 of the first pull member 71 is in slight contact with the first elastic body 721, and the gap (D5) is formed between the first elastic body 721 and one of the side walls 131. Since there is no frictional contact between the first packing member 72 and the one of the side walls 131, the first slide seat 31 can be slid upward and downward along the upright frame body 13. When the first pull member 71 is rotated to the locking position, as shown in FIG. 29, the first lobe 714 is moved to contact the first elastic body 721, and pushes and squeezes the first elastic body 721 to abut tightly against the one of the side walls 131. Since the first elastic body 721 is in frictional contact with the one of the side walls 131 at this time, the first slide seat 31 can be positioned on the upright frame body 13. The effect of locking the first slide seat 31 on the upright frame body 13 at a desired height along the first direction (Z) can thus be achieved.

Similarly, when the second pull member 81 is moved to the non-locking position, as shown in FIGS. 33 and 34, the outer surface 813 of the second pull member 81 is in slight contact with the second elastic body 821, and the gap (D6) is formed between the second elastic body 821 and the other one of the side walls 131. Since there is no frictional contact between the second packing member 82 and the other one of the side walls 131, the upright frame body 13 and the second slide seat 41 are movable relative to each other along the first direction (Z). When the second pull member 81 is rotated to the locking position, as shown in FIG. 32, the second lobe 814 is moved to contact the second elastic body 821, and pushes and squeezes the second elastic body 821 to abut tightly against the other one of the side walls 131. Since the second elastic body 821 is in frictional contact with the other one of the side walls 131 at this time, the second slide seat 41 is positioned on the upright frame body 13. The effect of locking the second slide seat 41 to the upright frame body 13 so as to position the upright frame body 13 at a desired height can thus be achieved.

Figure 35:
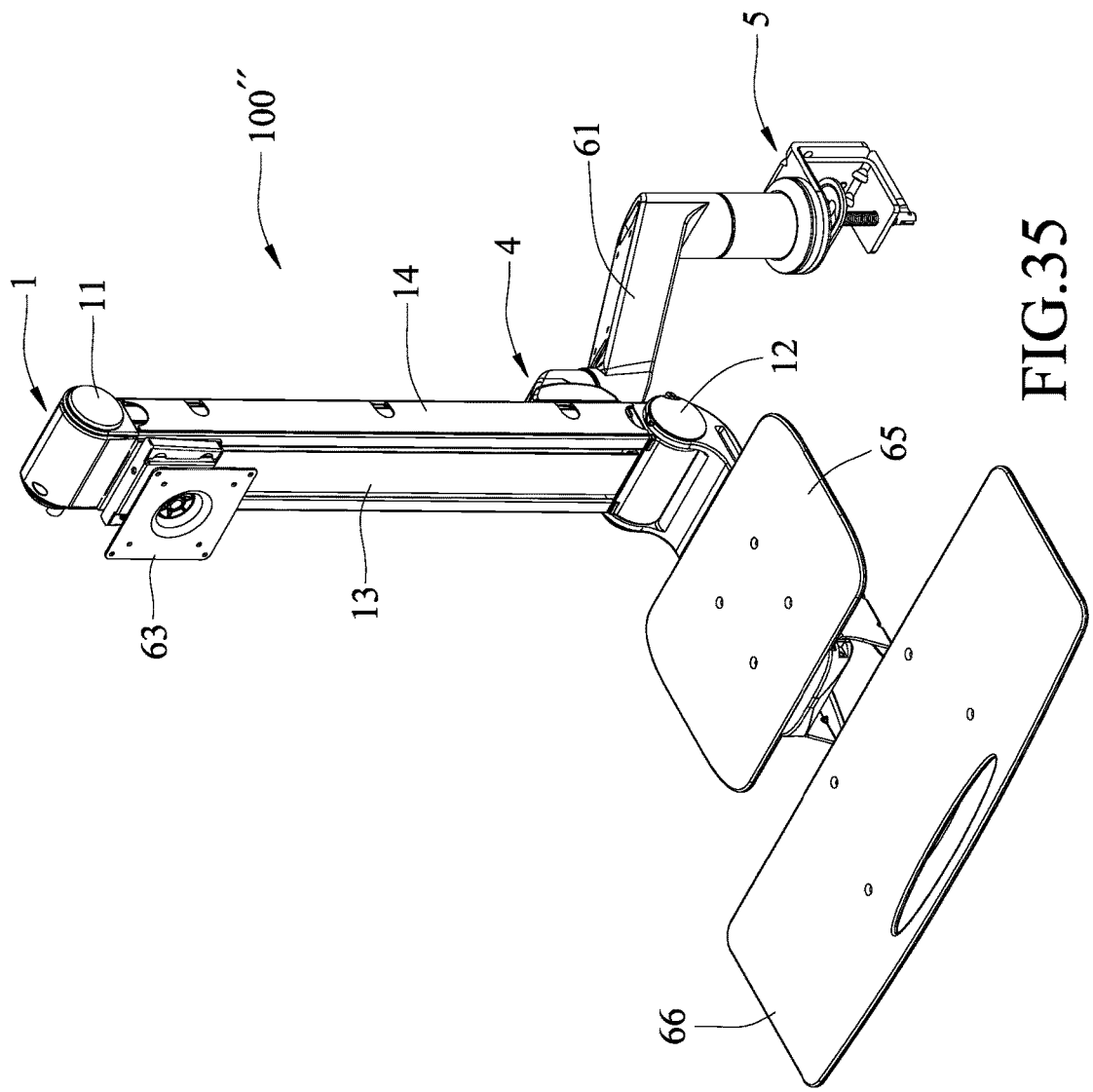
FIG. 35 is a perspective view of a support device according to the third embodiment of the present disclosure configured to support a monitor.
Figure 36:
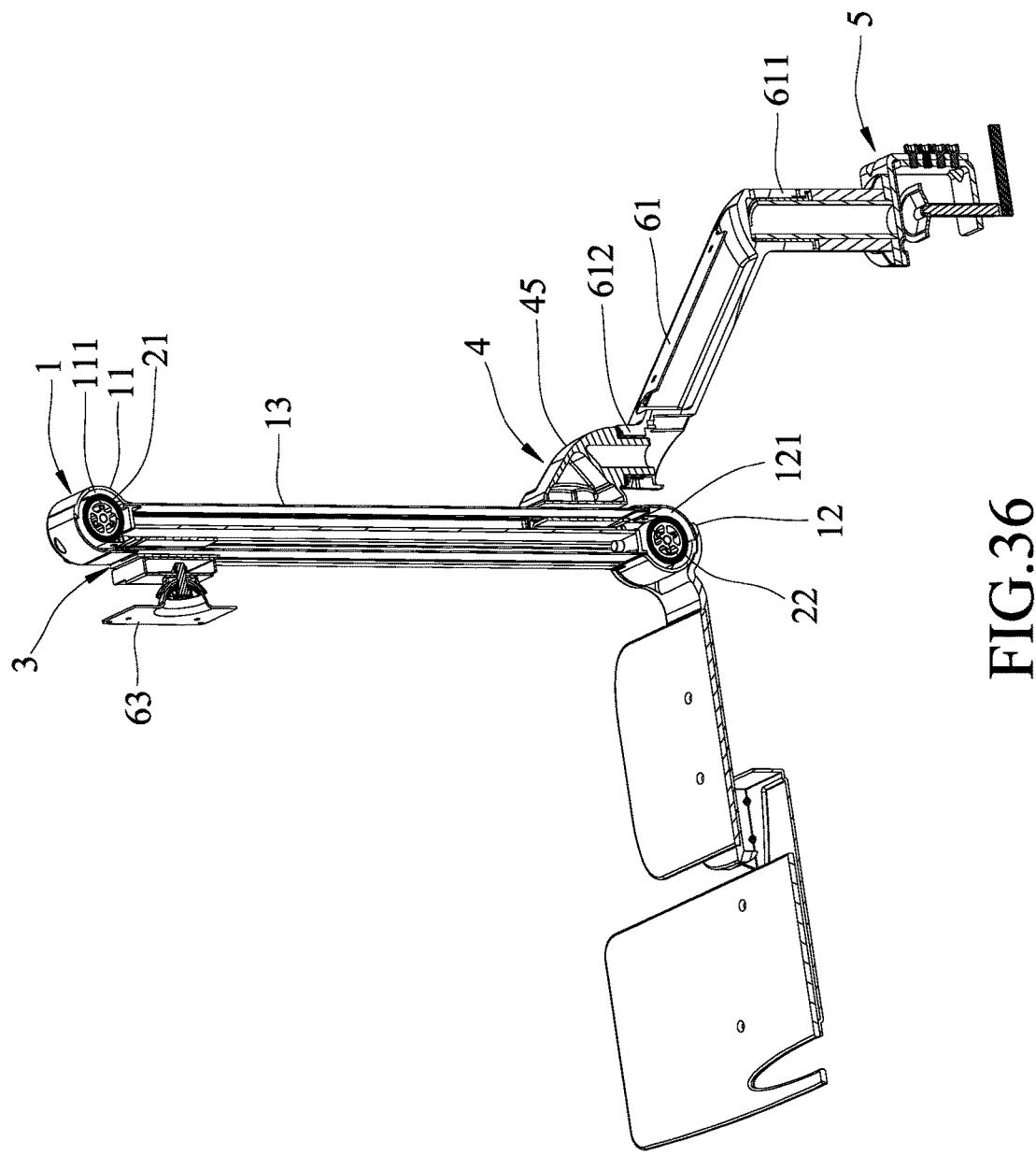
FIG. 36 is a perspective sectional view of the third embodiment.

Referring to FIGS. 35 and 36, the third embodiment of the support device 100" of this disclosure is shown to be identical to the first embodiment. However, in this embodiment, the auxiliary suspension arm 62 (see FIG. 1) is dispensed herewith, and the two opposite ends 611, 612 of the main suspension arm 61 are respectively connected to the connecting body 415 of the second slide unit 4 and the clamping seat 5. Advantages of the first embodiment can be similarly achieved using the third embodiment.

While the present disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A support device for supporting a monitor, comprising: an upright frame including an upright frame body, an upper member connected to a top end of said upright frame body and defining an upper receiving space, and a lower member connected to a bottom end of said upright frame body and defining a lower receiving space, said upright frame body including two opposite side walls, an intermediate wall interconnecting said side walls, two first slide grooves that are respectively formed in said side walls, that are located at one side of said intermediate wall and that communicate with said upper receiving space, and two second slide grooves that are respectively formed in said side walls, that are located at an opposite side of said intermediate wall and that communicate with said lower receiving space, each of said first and second slide grooves extending along a length direction of a corresponding one of said side walls;

an upper constant force spring configured as a rolled metal strip and including a coiled portion disposed in said upper receiving space, and a free end connected to said coiled portion;

a lower constant force spring configured as a rolled metal strip and including a coiled portion disposed in said lower receiving space, and a free end connected to said coiled portion of said lower constant force spring;

a first slide unit slidably mounted on said upright frame body, configured to be connected with the monitor, and including a first slide seat disposed on said one side of said intermediate wall and having two first protrusions received respectively in said first slide grooves, and an upper connecting piece disposed on a top portion of said first slide seat and connected to said free end of said upper constant force spring; and a second slide unit slidably mounted on said upright frame body and including a second slide seat disposed on said opposite side of said intermediate wall and having two second protrusions received respectively in said second slide grooves, and a lower connecting piece disposed on a bottom portion of said second slide seat and connected to said free end of said lower constant force spring.

2. The support device as claimed in claim 1, further comprising a monitor mount connected to said first slide seat and configured to support the monitor, a pivot seat pivotally connected to said lower member of said upright frame, and a work platform disposed on said pivot seat, said work platform being rotatable relative to said upright frame body through said pivot seat between a use position, in which said work platform is perpendicular to said upright frame body, and a stored position, in which said work platform is parallel to said upright frame body.

3. The support device as claimed in claim 2, wherein said pivot seat has a substantially L-shape, and includes a pivot portion pivotally connected to said lower member of said upright frame, a pivot plate extending from said pivot portion away from said lower member, and a pair of slide rails extending inwardly and respectively from two opposite side surfaces of said pivot plate, said work platform being fixed to a top surface of said pivot plate, said support device further comprising a support platform spaced apart from said work platform and having a flat plate, and a pair of spaced-apart positioning plates extending outwardly from said flat plate and engaged respectively and slidably with said pair of slide rails.

4. The support device as claimed in claim 1, further comprising a clamping seat spaced apart from said upright frame and configured to be clamped on a support surface, and a main suspension arm having two opposite ends respectively connected to said second slide seat and said clamping seat, said main suspension arm having a degree of freedom in rotation on a plane such that said upright frame can be moved relative to said clamping seat.

5. The support device as claimed in claim 4, further comprising an auxiliary suspension arm disposed between said main suspension arm and said clamping seat, said auxiliary suspension arm having a first end pivoted to said clamping seat, and a second end opposite to said first end and pivoted to one of said two opposite ends of said main suspension arm which is spaced apart from said second slide seat.

6. The support device as claimed in claim 1, wherein said upright frame further includes two side covers respectively disposed on outer sides of said side walls of said upright frame body, each of said side covers cooperating with a respective one of said side walls to define therebetween a wire-receiving groove for receiving electrical wires.

7. The support device as claimed in claim 1, wherein said first slide seat includes a first side plate spaced apart from said intermediate wall, a second side plate disposed between said first side plate and said intermediate wall, and two first connecting plates connected between said first and second side plates, said upper connecting piece being disposed on a top portion of said second side plate, said first protrusions respectively protruding from said first connecting plates.

8. The support device as claimed in claim 7, wherein each of said first slide grooves is defined by a first groove-defining wall, said first slide unit further includes a pair of first protective members each of which is disposed between said first groove-defining wall of one of said first slide grooves and a corresponding one of said first protrusions.

9. The support device as claimed in claim 7, wherein said second slide seat includes a first side plate spaced apart from said intermediate wall, a second side plate disposed between said first side plate of said second slide seat and said intermediate wall, and two second connecting plates connected between said first and second side plates of said second slide seat, said lower connecting piece being disposed on a bottom portion of said second side plate of said second slide seat, said second protrusions respectively protruding from said second connecting plates.

10. The support device as claimed in claim 9, wherein each of said second slide grooves is defined by a second groove-defining wall, said second slide unit further includes a pair of second protective members each of which is disposed between said second groove-defining wall of one of said second slide grooves and a corresponding one of said second protrusions.

11. The support device as claimed in claim 9, wherein said first slide seat further includes two first tubular rods connected to one side of said first side plate opposite to one of said first connecting plates and spaced apart from each other in a top-bottom direction along a first axial line, said support device further comprising a first locking unit pivoted to said first tubular rods, said first locking unit including a first pull member and a first packing member, said first pull member being operable to rotate relative to said first tubular rods between a locking position and a non-locking position, said first pull member including a first cam portion disposed between said first tubular rods, and a first pull portion connected to said first cam portion and configured to drive rotation of said first cam portion, said first cam portion defining a first pivot hole extending along the first axial line, and having an outer surface and a first lobe protruding therefrom, said outer surface of said first cam portion being spaced apart from the first axial line by a distance which is smaller than a distance from said first lobe to the first axial line, said first packing member being disposed between said first cam portion and said first tubular rods, and wherein, when said first pull member is operated to rotate to the locking position, said first lobe pushes and squeezes said first packing member to abut tightly against one of said side walls, and when said first pull member is operated to rotate to the non-locking position, said first slide seat is movable upward and downward relative to said upright frame body.

12. The support device as claimed in claim 11, wherein said first packing member includes a first elastic body disposed between said first tubular rods and said one of said side walls, and two first lug portions that protrude from one side of said first elastic body, that are spaced apart from each other along the first axial line and that are located on top and bottom sides of said first cam portion, said first locking unit further including a first pivot rod inserted into said first tubular rods, said first pivot hole and said first lug portions, and wherein, when said first pull member is in the locking position, said first elastic body is pushed by said first lobe to abut tightly against said one of said side walls, and when said first pull member is in the non-locking position, a gap is formed between said first elastic body and said one of said side walls.

13. The support device as claimed in claim 12, wherein said upright frame body further includes two first inner walls that are parallel to said intermediate wall, that are adjacent to said second side plate of said first slide seat and that cooperatively define a first guide groove, and two first connecting walls each of which is connected between one of said first inner walls and said intermediate wall, said upper connecting piece having a bottom end fixed to said top portion of said first slide seat by a screw bolt which is disposed in said first guide groove.

14. The support device as claimed in claim 11, wherein said first packing member is made of rubber.

15. The support device as claimed in claim 11, wherein said second slide seat further includes two second tubular rods connected to one side of said first side plate of said second slide seat opposite to one of said second connecting plates and spaced apart from each other in the top-bottom direction along a second axial line, said support device further comprising a second locking unit pivoted to said second tubular rods, said second locking unit including a second pull member and a second packing member, said second pull member being operable to rotate relative to said second tubular rods between a locking position and a non-locking position, said second pull member including a second cam portion disposed between said second tubular rods, and a second pull portion connected to said second cam portion and configured to drive rotation of said second cam portion, said second cam portion defining a second pivot hole extending along the, and having an outer surface and a second lobe protruding from said outer surface of said second cam portion, said outer surface of said second cam portion being spaced apart from the second axial line by a distance which is smaller than a distance from said second lobe to the second axial line, said second packing member being disposed between said second cam portion and said second tubular rods, and wherein, when said second pull member is operated to rotate to the locking position, said second lobe pushes and squeezes said second packing member to abut tightly against the other one of said side walls, and when said second pull member is operated to rotate to the non-locking position, said second slide seat and said upright frame body are movable relative to each other.

16. The support device as claimed in claim 15, wherein said second packing member includes a second elastic body disposed between said second tubular rods and the other one of said side walls, and two second lug portions that protrude from one side of said second elastic body, that are spaced apart from each other along the second axial line and that are located on top and bottom sides of said second cam portion, said second locking unit further including a second pivot rod inserted into said second tubular rods, said second pivot hole and said second lug portions, and wherein, when said second pull member is in the locking position, said second elastic body is pushed by said second lobe to abut tightly against the other one of said side walls, and when said second pull member is in the non-locking position, a gap is formed between said second elastic body and the other one of said side walls.

17. The support device as claimed in claim 16, wherein said upright frame body further includes two second inner walls that are parallel to said intermediate wall, that are adjacent to said second side plate of said second slide seat and that cooperatively define a second guide groove, and two second connecting walls each of which is connected between one of said second inner walls and said intermediate wall, said lower connecting piece having a top end fixed to said bottom portion of said second slide seat by a screw bolt which is disposed in said second guide groove.

18. The support device as claimed in claim 15, wherein said second packing member 82 is made of rubber.

\* \* \* \* \*